United States Patent
Wang et al.

(10) Patent No.: US 12,184,581 B2
(45) Date of Patent: *Dec. 31, 2024

(54) USER EQUIPMENT, BASE STATION, AND COMMUNICATION THEREOF

(71) Applicant: Panasonic Intellectual Property Corporation of America, Torrance, CA (US)

(72) Inventors: Lilei Wang, Beijing (CN); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/417,797

(22) Filed: Jan. 19, 2024

(65) Prior Publication Data
US 2024/0163061 A1 May 16, 2024

Related U.S. Application Data

(63) Continuation of application No. 18/174,496, filed on Feb. 24, 2023, which is a continuation of application
(Continued)

(51) Int. Cl.
*H04W 72/12* (2023.01)
*H04L 5/00* (2006.01)
(Continued)

(52) U.S. Cl.
CPC .......... *H04L 5/0053* (2013.01); *H04L 5/0007* (2013.01); *H04L 5/0091* (2013.01);
(Continued)

(58) Field of Classification Search
CPC ... H04L 5/0053; H04L 5/0007; H04L 5/0091; H04W 72/0446; H04W 72/20
See application file for complete search history.

(56) References Cited

U.S. PATENT DOCUMENTS 10,440,706 B2 10/2019 Yin et al.
10,498,513 B2 12/2019 Marinier et al.
(Continued)

FOREIGN PATENT DOCUMENTS

WO WO 2016142978 A1 9/2016
WO WO 2016142979 A1 9/2016
(Continued)

OTHER PUBLICATIONS

3GPP TSG-RAN WG1#89, R1-1707291 Title: Discussion of DCI formats for sTTI scheduling (Year: 2017).*
(Continued)

*Primary Examiner* — Christopher M Crutchfield
*Assistant Examiner* — Abusayeed M Haque
(74) *Attorney, Agent, or Firm* — Seed IP Law Group LLP

(57) ABSTRACT

There are provided a user equipment, a base station, and a communication thereof. The UE operative for sidelink transmission based on base station scheduling, comprising: a receiver, operative to receive first control information from a base station; determination circuitry, operative to determine whether a shortened time interval is used for a signaling interaction of the user equipment and the base station for sidelink transmission according to the received first control information; and a transmitter, operative to transmit second control information to the base station during the signaling interaction using the shortened time interval after the determination circuitry determines that the shortened time interval is used for the signaling interaction for sidelink transmission; wherein a length of the shortened time interval is less than a length of a standard time interval.

20 Claims, 17 Drawing Sheets

Related U.S. Application Data

No. 16/651,275, filed as application No. PCT/CN2017/111665 on Nov. 17, 2017, now Pat. No. 11,626,956.

(51) Int. Cl.
  *H04W 72/0446* (2023.01)
  *H04W 72/20* (2023.01)
  *H04W 72/23* (2023.01)
  *H04W 76/27* (2018.01)

(52) U.S. Cl.
  CPC ....... *H04W 72/0446* (2013.01); *H04W 72/20* (2023.01); *H04W 72/23* (2023.01); *H04W 76/27* (2018.02)

(56) References Cited

U.S. PATENT DOCUMENTS

| | | | |
|---|---|---|---|
| 10,595,166 | B2 | 3/2020 | Yin et al. |
| 10,917,904 | B2 | 2/2021 | Shimezawa |
| 2016/0338095 | A1 | 11/2016 | Faurie et al. |
| 2017/0289733 | A1 | 10/2017 | Rajagopal et al. |
| 2018/0035329 | A1 | 2/2018 | Futaki |
| 2018/0035430 | A1 | 2/2018 | Futaki |
| 2018/0077658 | A1 | 3/2018 | Nary et al. |
| 2018/0077721 | A1* | 3/2018 | Nory ................ H04W 72/0466 |
| 2018/0098235 | A1 | 4/2018 | Bagheri et al. |
| 2018/0234998 | A1 | 8/2018 | You et al. |
| 2018/0359068 | A1 | 12/2018 | Kim et al. |
| 2019/0028162 | A1 | 1/2019 | Lee et al. |
| 2019/0045127 | A1 | 2/2019 | Takeuchi |
| 2019/0045527 | A1 | 2/2019 | Shimezawa |
| 2019/0090276 | A1 | 3/2019 | Lee et al. |
| 2019/0098611 | A1 | 3/2019 | Shimezawa et al. |
| 2019/0116592 | A1 | 4/2019 | Moon et al. |
| 2019/0141679 | A1 | 5/2019 | He et al. |
| 2019/0174530 | A1 | 6/2019 | Kim et al. |
| 2019/0223204 | A1 | 7/2019 | Kim et al. |
| 2019/0229964 | A1* | 7/2019 | Ouchi ................ H04L 5/0051 |
| 2019/0268107 | A1 | 8/2019 | Yasukawa et al. |
| 2019/0312669 | A1 | 10/2019 | Kwak et al. |
| 2019/0357154 | A1 | 11/2019 | Zeng et al. |
| 2020/0022098 | A1 | 1/2020 | Takeda et al. |
| 2021/0203450 | A1 | 7/2021 | Xu et al. |

FOREIGN PATENT DOCUMENTS

| | | | | |
|---|---|---|---|---|
| WO | WO 2017052686 | A1 | 3/2017 | |
| WO | WO-2017172488 | A1 * | 10/2017 | ........... H04L 1/1812 |
| WO | WO-2017172535 | A1 * | 10/2017 | ........... H04L 1/1854 |
| WO | WO-2017172538 | A1 * | 10/2017 | ........... H04L 1/1854 |
| WO | WO 2017173038 | A1 | 10/2017 | |
| WO | WO-2017173177 | A1 * | 10/2017 | ........... H04L 5/0044 |
| WO | WO 2017193349 | A1 | 11/2017 | |

OTHER PUBLICATIONS

3GPP TSG RAN WG1, Meeting#86, R1-166707 Title:Coexistance between subframe TTI and sTTI operations for DL and UL (Year: 2016).*

International Search Report, dated Aug. 29, 2018, for PCT Patent Application No. PCT/CN2017/111665. (2 pages).

* cited by examiner

USER EQUIPMENT, BASE STATION, AND COMMUNICATION THEREOF

BACKGROUND

1. Technical Field

The present technology relates to wireless communication field, and more particular, to a user equipment (UE) for sidelink transmission based on base station scheduling, to a base station for scheduling sidelink transmission for UEs, and to communication thereof.

2. Description of the Related Art

Long term evolution (LTE)-vehicle to everything (V2X) has two modes on resource scheduling/selection. One is eNB based scheduling (mode 3) and the other is UE autonomous scheduling (mode 4). In mode 3, a UE communicates with the eNB for sidelink scheduling before starting a sidelink transmission to another UE, and in mode 4, the UE may autonomously start a sidelink transmission to another UE without eNB's participation.

SUMMARY

One non-limiting and exemplary embodiment facilitates avoiding unnecessary retransmission and improving communication performance effectively.

In one general aspect, it is to provide a user equipment (UE) operative for sidelink transmission based on base station scheduling, comprising: a receiver, operative to receive first control information from a base station; determination circuitry, operative to determine whether a shortened time interval is used for a signaling interaction of the user equipment and the base station for sidelink transmission according to the received first control information; and a transmitter, operative to transmit second control information to the base station using the shortened time interval during the signaling interaction after the determination circuitry determines that the shortened time interval is used for the signaling interaction for sidelink transmission, wherein a length of the shortened time interval is less than a length of a standard time interval.

In another general aspect, it is to provide a communication method for a user equipment operative for sidelink transmission based on base station scheduling, comprising: receiving first control information from a base station; determining whether a shortened time interval is used for a signaling interaction of the user equipment and the base station for sidelink transmission according to the received first control information; and transmitting second control information to the base station using the shortened time interval during the signaling interaction after determining that the shortened time interval is used for the signaling interaction for sidelink transmission, wherein a length of the shortened time interval is less than a length of a standard time interval.

In another general aspect, it is to provide a base station operative for scheduling sidelink transmission for a user equipment (UE), comprising: a control information generator, operative to generate first control information; and a transmitter, operative to transmit the first control information to the user equipment, wherein whether to use a shortened time interval for a signaling interaction of the base station and the user equipment for sidelink transmission is indicated by transmitting the first control information, and wherein a length of the shortened time interval is less than a length of a standard time interval.

In another general aspect, it is to provide a communication method for a base station scheduling sidelink transmission for a user equipment (UE), comprising: generating first control information at the base station; and transmitting the first control information to the user equipment to indicate whether to use a shortened time interval for a signaling interaction of the base station and the user equipment for sidelink transmission, and wherein a length of the shortened time interval is less than a length of a standard time interval.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually acknowledged by the various embodiments and features of the specification and drawings, which need not all be provided in order to acknowledge one or more of such benefits and/or advantages.

DETAILED DESCRIPTION

Figure 1A:
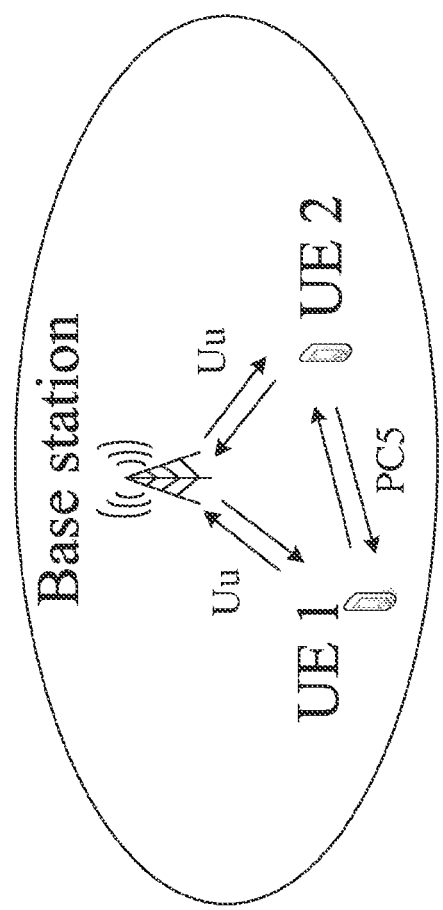
FIGS. 1A-1B schematically show examples of application scenarios applying a communication scheme according to an embodiment of the present disclosure.

Embodiments will now be described with reference to the drawings, which relate to a communication method, apparatus and system. It is understood that the present technology may be embodied in many different forms and in many different orders and should not be construed as being limited to the embodiments set forth herein. Rather, these embodiments are provided so that this disclosure will be thorough and complete and will fully convey the present technology to those skilled in the art. Indeed, the present technology is intended to cover alternatives, modifications and equivalents of these embodiments, which are included within the scope and spirit of the technology as defined by the appended claims. Furthermore, in the following detailed description of the present technology, numerous specific details are set forth in order to provide a thorough understanding of the present technology. However, it will be clear to those of ordinary skill in the art that the present technology may be practiced without such specific details.

While orders of the steps of the methods and the structures of the components are provided herein for exemplary purposes, but not for limitation. The following detailed description of the technology will be presented for purposes of illustration and description. It is not intended to be exhaustive or to limit the technology to the precise form disclosed. Many modifications and variations are possible in light of the above teaching. The described embodiments are chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

For both modes of mode 3 and mode 4 in LTE-V2X system, latency reduction is a critical target to satisfy some latency-sensitive traffics based on requirement from SA (3GPP 22.886). For example, for some cases of advanced driving, the max end-to-end latency requirement is 3 ms or 10 ms, for some cases of platooning, the max end-to-end latency requirement is 10 ms or 20 ms, and for some cases of extended sensors, the max end-to-end latency requirement is 3 ms or 10 ms. Therefore, reducing latency is desired for V2X.

Currently, in LTE-V2X system, for mode 3 which is eNB based scheduling, basically there are several steps on signaling interaction of a user equipment (UE) with eNB before sidelink transmission (especially for transmission at early stage).

A following table A shows these steps and their corresponding delay.

TABLE A

Signaling interaction and corresponding latency

| Step | Description | Delay |
|------|-------------|-------|
| 1 | Average delay to next SR opportunity | SR periodicity/2 |
| 2 | UE sends SR | 1 TTI |
| 3 | eNB decodes SR and generates scheduling grant | 3 TTI |
| 4 | Transmission of scheduling grant (assumed always error free) | 1 TTI |
| 5 | UE processing delay (decoding Scheduling grant + L1 encoding of data) | 3 TTI |
| 6 | UE sends BSR | 1 TTI |
| 7 | eNB decodes BSR and generates scheduling grant | 3 TTI |
| 8 | eNB transmission of scheduling grant (assumed as being always error free) | 1 TTI |
| 9 | UE processing and transmission delay (decoding scheduling grant + L1 encoding of data) | 4 TTI |

In the above table A, SR is a scheduling request sent by UE, and BSR is a buffer-status report sent by UE and indicates the amount of data to be transmitted via sidelink.

Assuming that the SR periodicity is 1-10 ms, thus, for transmission in mode 3, UE needs, 22 TTIs (22 ms) in average, which is relatively larger with respect to certain latency requirements in some scenarios.

Latency reduction was hotly discussed in 3GPP RAN2 before and it is a general issue regardless of V2X. An exemplified proposed scheme to reduce latency is implemented by simplifying the interaction steps of resource scheduling, that is, UE directly sending BSR instead of SR initially. Then the averaged latency may be reduced to 14 ms from 22 ms. However, it is still quite difficult to satisfy the latency requirement e.g., 10 ms.

Figure 1B:
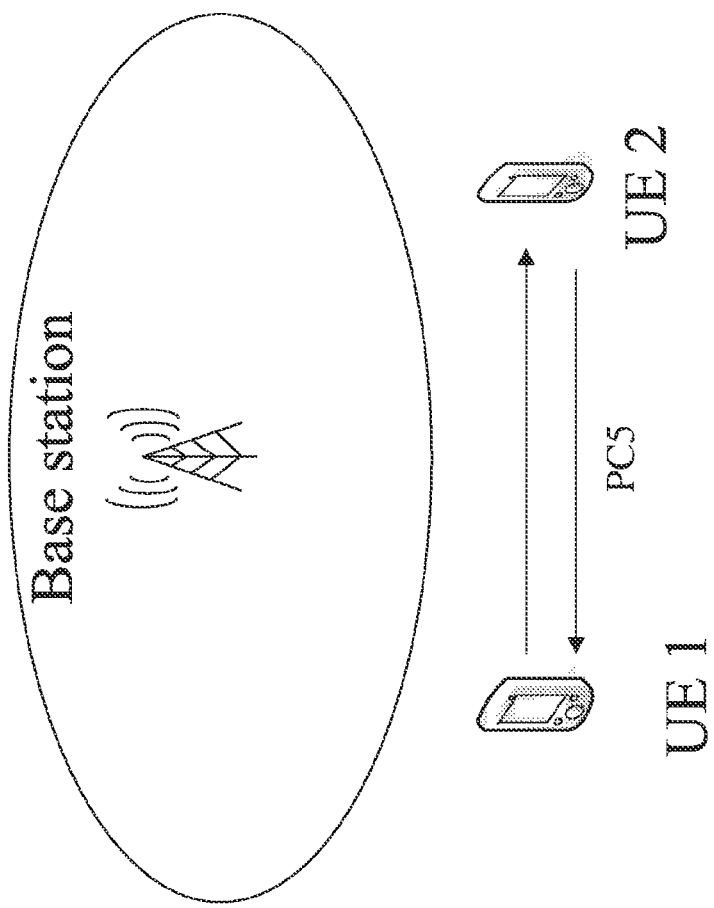

FIGS. 1A-1B schematically show examples of application scenarios applying a communication scheme according to an embodiment of the present disclosure.

More specifically, FIG. 1A shows an example of an application scenario as mode 3 in LTE-V2X. The application scenario includes a base station and multiple user equipments, such as a first user equipment UE1 and a second user equipment UE2 as shown in FIG. 1A. In mode 3, the base station schedules sidelink transmission for the UEs. The UEs interacts signaling with the base station in a bidirectional mode via uplink and downlink for sidelink scheduling, and then communicates with other UEs in a bidirectional mode via sidelink by transmitting data (e.g., user data) and signaling to the other UEs and/or receiving data (e.g., user data) and signaling from the other UEs. A communication method according to embodiments of the present disclosure may be applied to the application scenario shown in FIG. 1A. The embodiment shown in FIG. 1A is only for illustrative purposes, there may be any number of UEs and base stations depending on the requirements of particular applications.

FIG. 1B shows an example of an application scenario as mode 4 in LTE-V2X. The application scenario includes a base station and multiple user equipments, such as a first user equipment UE1 and a second user equipment UE2 as shown in FIG. 1B. In mode 4, a UE autonomously schedules sidelink transmission, and communicates with the other UEs via sidelink A communication method according to an embodiment of the present disclosure may be applied to the application scenario shown in FIG. 1B. The embodiment shown in FIG. 1B is only for illustrative purposes, there may be any number of UEs and base stations depending on the requirements of particular applications.

Figure 2:
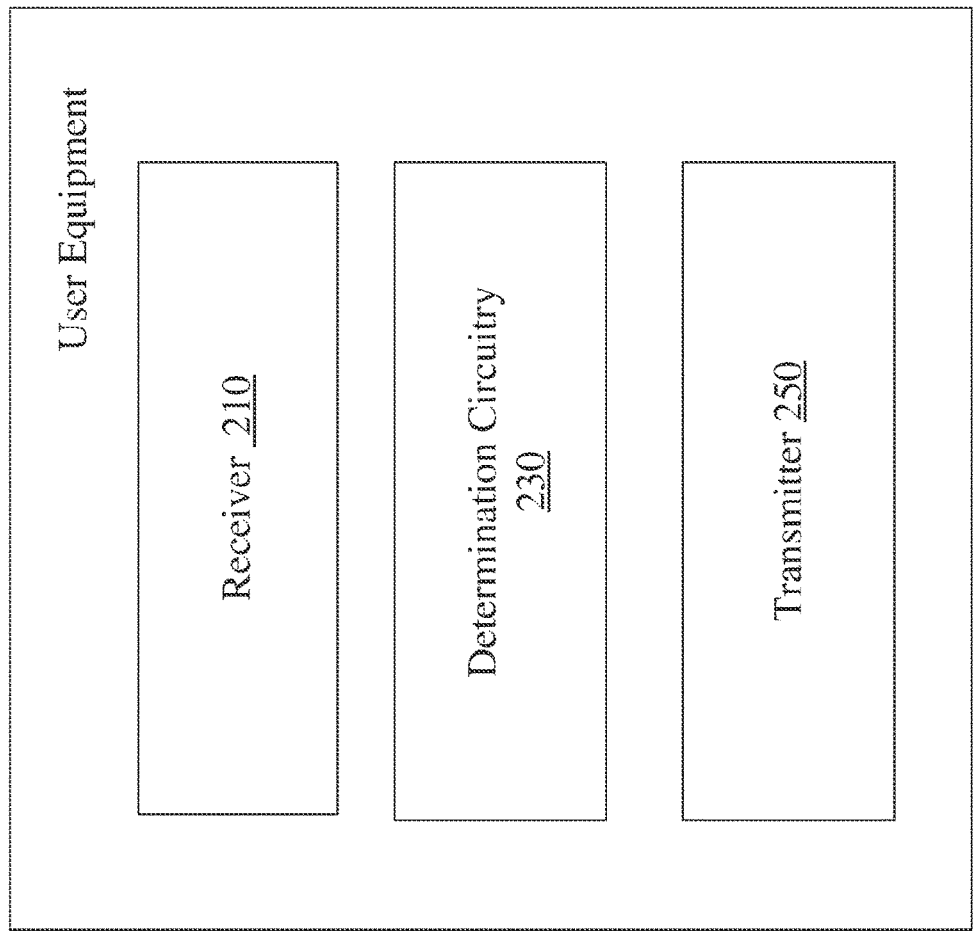
FIG. 2 schematically shows a block diagram of an example of a user equipment according to an embodiment of the present disclosure.

FIG. 2 schematically shows a block diagram of an example of a user equipment 200 according to an embodiment of the present disclosure.

In an embodiment (for example, in mode 3), the user equipment 200 is operative for sidelink transmission based on base station scheduling, and the user equipment 200 includes a receiver 210, determination circuitry 230, and a transmitter 250. In an embodiment, the receiver 210 may receive first control information from a base station. The determination circuitry 230 may determine whether a shortened time interval is used for a signaling interaction of the user equipment and the base station for sidelink transmission according to the received first control information. The transmitter 250 may transmit second control information to the base station during the signaling interaction using the shortened time interval after the determination circuitry 230 determines that the shortened time interval is used for the signaling interaction.

In an embodiment, the base station may decide which time interval length (shortened time interval or standard time interval) is used for the signaling interaction. When using the shortened time interval, the base station may further determine the length of the shortened time interval depending on latency requirement of the communication. In another embodiment, UE may select which time interval length is used for the signaling interaction and reports the selected time interval to the base station, and the base station may further decide to follow or override the selection of the UE, the details of which will illustrated in the following.

In an embodiment, the sidelink transmission uses uplink carriers. In an embodiment, the sidelink transmission uses dedicated carriers, e.g., sidelink dedicated carriers or intelligent Transportation System (ITS) dedicated carriers.

In one embodiment, the UE 200 may be a UE in LTE-V2X system, in that condition, the shortened time interval is a shortened transmission time interval (sTTI), which is shorter than the standard time interval, the standard time interval is a transmission time interval (TTI), and in some cases, sTTI may be a fraction of TTI in terms of OFDM symbol. For example, sTTI may correspond to at least one OFDM symbol in a TTI. But this is not a limitation, and other lengths of sTTI are available, as long as the length of sTTI is shorter than the length of the standard time interval. In an embodiment, the user equipment 200 transmits second control information to the base station during the signaling interaction using sTTI after determining that the sTTI is used for the signaling interaction.

In an embodiment, the configuration of using TTI or sTTI for the signaling interaction may be explicitly indicated to the UE by radio resource control (RRC) signaling or downlink control information (DCI) of the control information. In an embodiment, the first control information includes radio resource control (RRC) signaling, and the RRC signaling may explicitly indicate using the TTI or sTTI for the signaling interaction of the UE and the base station. For example, a field in the RRC signaling may indicate using the TTI or sTTI for the signaling interaction. In another embodiment, the first control information includes downlink control information (DCI), and the DCI may explicitly indicate using the TTI or sTTI for the signaling interaction of the UE and the base station. For example, a field in the DCI format may indicate using the TTI or sTTI for the signaling interaction. In another embodiment, the first control information includes RRC signaling and DCI, and using the TTI or sTTI for the signaling interaction of the UE and the base station may be indicated by a combination of RRC and DCI. The determination circuitry 230 of the UE 200 determines whether the shortened time interval (sTTI as referred in LTE) or standard time interval (TTI as referred in LTE) is used for the signaling interaction according to one or more of radio resource control (RRC) signaling and the downlink control information. The detailed explanation will be described in combination with FIG. 3A and FIG. 3B.

Figure 3A:
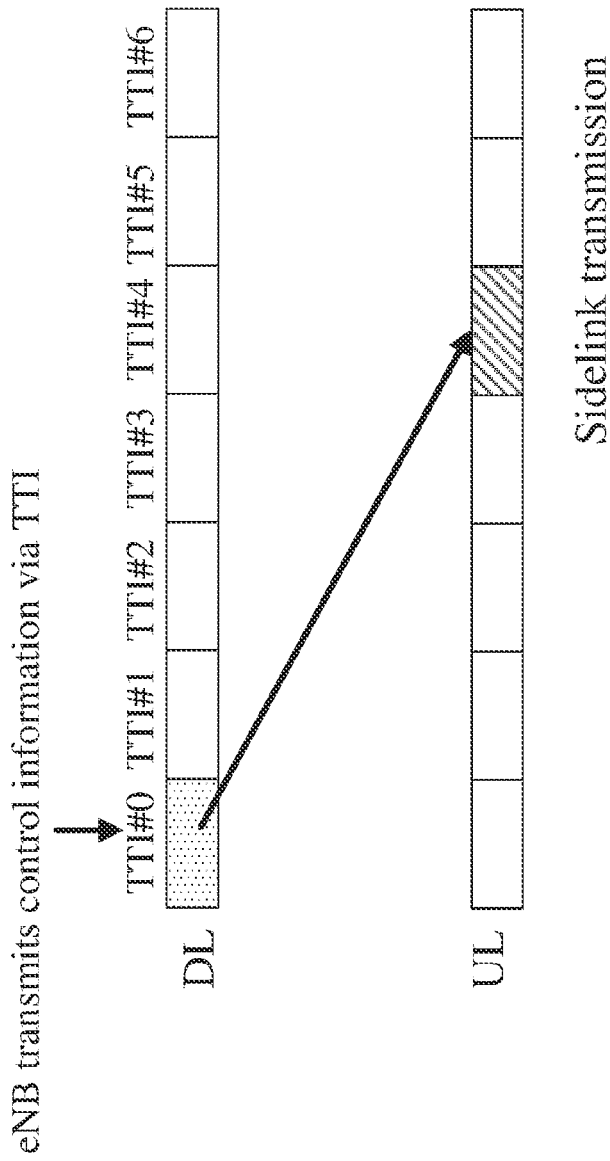
FIG. 3A schematically shows a signaling interaction of a base station and a user equipment for sidelink transmission using transmission time interval (TTI) according to an embodiment of the present disclosure.

FIG. 3A schematically shows a signaling interaction of a base station and a user equipment for sidelink transmission using TTI that is explicitly indicated by the first control information according to an embodiment of the present disclosure.

The embodiment shown in FIG. 3A is an example for mode 3 in LTE-V2X. A base station, e.g., eNB, may schedule sidelink transmission for a UE, e.g., UE 200 shown in FIG. 2. As shown in the example of FIG. 3A, TTI is used for a signaling interaction of the eNB and the UE 200. If TTI is used, the steps during the signaling interaction, such as transmitting SR, receiving UL grant, transmitting BSR and receiving sidelink grant, are all performed based on TTI, which is the basic time unit for transmission/reception/processing in LTE-V2X.

As shown in FIG. 3A, eNB transmits first control information to the UE, e.g., UE 200 shown in FIG. 2. More specifically, as shown in the example of FIG. 3A, the eNB transmits first control information, such as RRC or DCI or a combination thereof explicitly indicating using TTI for signaling interaction, at TTI#0. The determination circuitry 230 in the UE 200 determines whether TTI or sTTI is used for the signaling interaction according to one or more of radio resource control (RRC) signaling and the downlink control information. In the example of FIG. 3A, the determination circuitry 230 determines that TTI is used for signaling interaction. Then the transmitter 250 of the UE 200 transmits second control information using TTI for interacting with the eNB, and TTI is used for the signaling interaction of the UE 200 and the eNB for sidelink transmission.

As shown in the example of FIG. 3A, 4 TTIs (e.g., TTI#0~TTI#3) are used for signaling interaction of the UE and the base station via uplink and downlink for scheduling sidelink transmission. At TTI#4, the UE 200 performs sidelink transmission. FIG. 3A is for illustrative purpose, and the signaling interaction latency is variable according to practical application, and UE 200 may perform sidelink transmission at other times (e.g., TTI#n, and n is an integer).

Figure 3B:
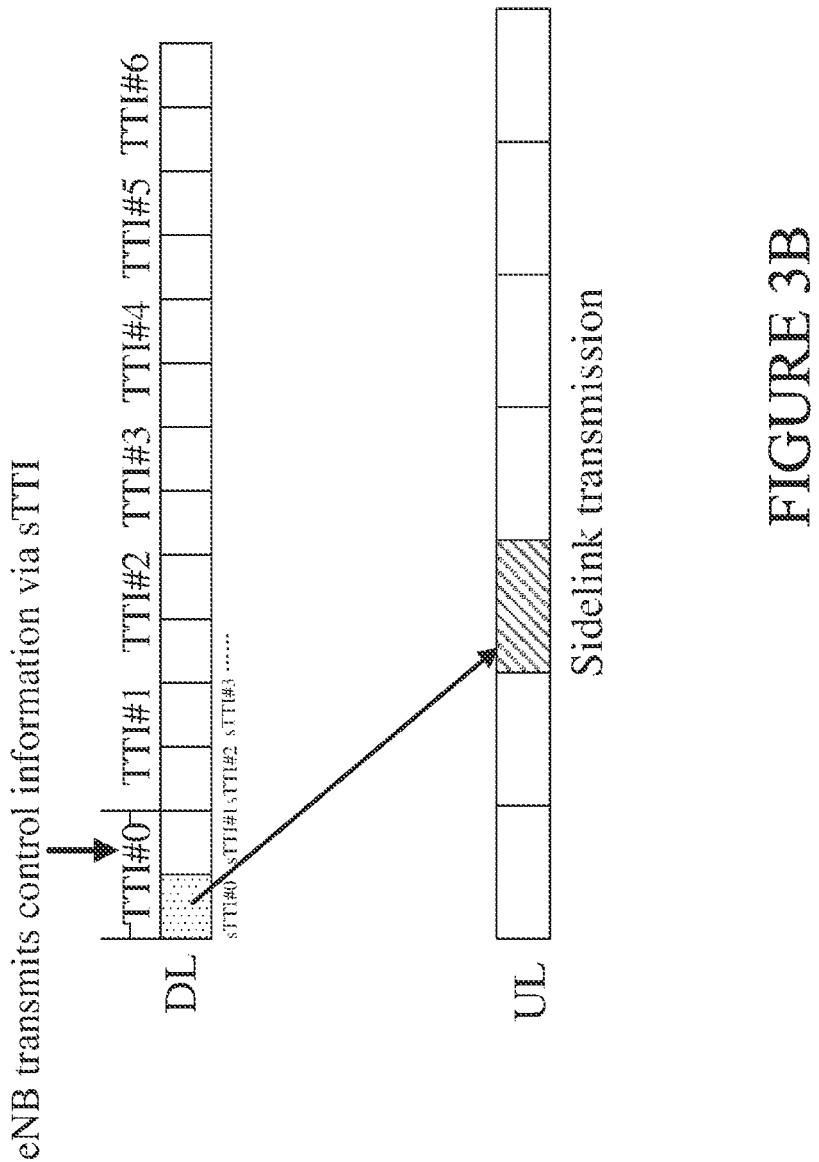
FIG. 3B schematically shows a signaling interaction of a base station and a user equipment for sidelink transmission using shortened transmission time interval (sTTI) according to an embodiment of the present disclosure.

FIG. 3B schematically shows a signaling interaction of a base station and a user equipment for sidelink transmission using shortened transmission time interval (sTTI) that is explicitly indicated by the first control information according to an embodiment of the present disclosure.

The embodiment shown in FIG. 3B is exemplary for mode 3 in LTE-V2X. A base station, e.g., eNB, may schedule sidelink transmission for a UE, e.g., UE 200 shown in FIG. 2. As shown in the example of FIG. 3B, sTTI is used for a signaling interaction of the eNB and the UE 200.

In an embodiment, eNB transmits the first control information to the UE, e.g., UE 200 shown in FIG. 2. More specifically, as shown in the example of FIG. 3B, the eNB transmits first control information, such as RRC or DCI or a combination thereof, explicitly indicating using sTTI for the signaling interaction, at sTTI#0. The determination circuitry 230 in the UE 200 determines whether sTTI or TTI is used for the signaling interaction according to one or more of radio resource control (RRC) signaling and the downlink control information. For example, the determination circuitry 230 may check the RRC or the DCI, and determine that sTTI is used if the RRC or DCI explicitly indicate using sTTI, e.g., via a field in RRC or DCI. In the example of FIG.

3B, the determination circuitry 230 determines that sTTI is used for signaling interaction. Then the transmitter 250 of the UE 200 transmits second control information using sTTI for interacting with the eNB, and sTTI is used for the signaling interaction of the UE 200 and the eNB for sidelink transmission. As shown in the example of FIG. 3B, 4 sTTIs (e.g. sTTI#0~sTTI#3 corresponding to TTI#0~TTI#2 if sTTI is a half of the length of TTI) are used for signaling interaction of the UE and the base station via uplink and downlink for scheduling sidelink transmission. At TTI#2, the UE 200 performs sidelink transmission. FIG. 3B is only for illustrative purpose, and the signaling interaction latency is variable according to practical application, and the UE 200 may perform sidelink transmission at other times (e.g., TTI#n, and n is an integer).

As shown in FIG. 3B, the length of sTTI is a half of the length of TTI, that is, sTTI length equals to 0.5 ms when TTI length is 1 ms, and the overall latency of the signaling interaction may be reduced by a half compared with using TTI in the whole signaling interaction process, therefore, the latency of the signaling interaction of UE and base station is greatly reduced. Although the length of sTTI shown in FIG. 3B is a half of the length of TTI, that is, sTTI includes 7 OFDM symbols of 14 OFDM symbols in TTI, the embodiment shown in FIG. 3B is only for illustrative purposes, and the length of sTTI can be varied depending on the latency requirements of particular applications.

In addition, different V2X traffic may have different latency requirements. Some of traffics require small latency, while some other traffic are not sensitive to latency. Therefore, using the control information such as RRC, DCI or a combination thereof to explicitly indicate TTI length, such as, whether or not to use sTTI and configure the length of sTTI when used, can realize flexibility on requirement for different traffics.

In an embodiment, the configuration of using TTI or sTTI for the signaling interaction may be implicitly indicated to the UE by transmitting the DCI of the control information transmitted by a base station to the UE. For the UE 200, the determination circuitry 230 of the UE 200 may determine whether TTI or sTTI is used for the signaling interaction according to a control resource that the UE 200 receives the control information, a size of DCI, or a search space in the UE, or a combination thereof. The detailed of which will be explained in combination with FIG. 4A and FIG. 4B.

Figure 4A:
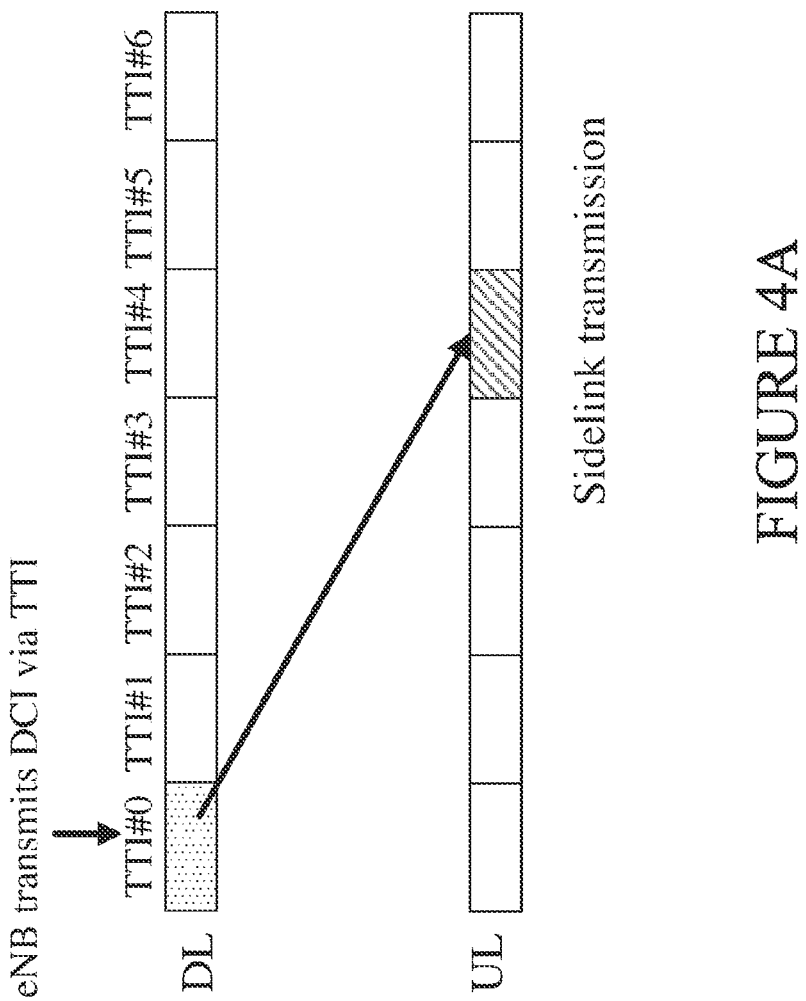
FIG. 4A schematically shows a signaling interaction of a base station and a user equipment for sidelink transmission using transmission time interval (TTI) according to another embodiment of the present disclosure.

FIG. 4A schematically shows a signaling interaction of a base station and a user equipment for sidelink transmission using transmission time interval (TTI) that is implicitly indicated by transmitting the first control information according to an embodiment of the present disclosure.

The embodiment shown in FIG. 4A is exemplary for mode 3 in LTE-V2X. A base station, e.g., eNB, may schedule sidelink transmission for a UE, e.g., UE 200 shown in FIG. 2. As shown in FIG. 4A, TTI is used for a signaling interaction of the eNB and the UE 200.

More specifically, as shown in the example of FIG. 4A, the eNB transmits first control information, such as DCI, using TTI, at TTI#0. In an embodiment, the determination circuitry 230 in the UE 200 determines whether TTI or sTTI is used for the signaling interaction based on the received first control information, e.g. the DCI. For example, the determination circuitry 230 determines that TTI is used for the signaling interaction when the receiver 210 receives the DCI within a control resource specified for the TTI. In another embodiment, the determination circuitry 230 may determine whether TTI is used for the signaling interaction according to a size of received DCI. For example, if the size of the received DCI is greater than a predetermined size, the determination circuitry 230 determines that TTI is used for the signaling interaction. In another embodiment, the determination circuitry 230 may also determine whether TTI is used for the signaling interaction according to a search space, e.g., a location of the search space.

In the example of FIG. 4A, the determination circuitry 230 determines that TTI is used for signaling interaction. As shown in the example of FIG. 4A, 4 TTIs (e.g., TTI#0~TTI3) are used for signaling interaction of the UE and the base station via uplink and downlink for scheduling sidelink transmission. After determining that TTI is used for the signaling interaction, the transmitter 250 of the UE 200 transmits second control information using TTI for interacting with the eNB, and TTI is used for the signaling interaction of the UE 200 and the eNB for sidelink transmission. At TTI#4, the UE 200 performs sidelink transmission. FIG. 4A is only for illustrative purpose, and the signaling interaction latency is variable according to practical application, and the UE 200 may perform sidelink transmission at other times (e.g., TTI#n, and n is an integer).

Figure 4B:
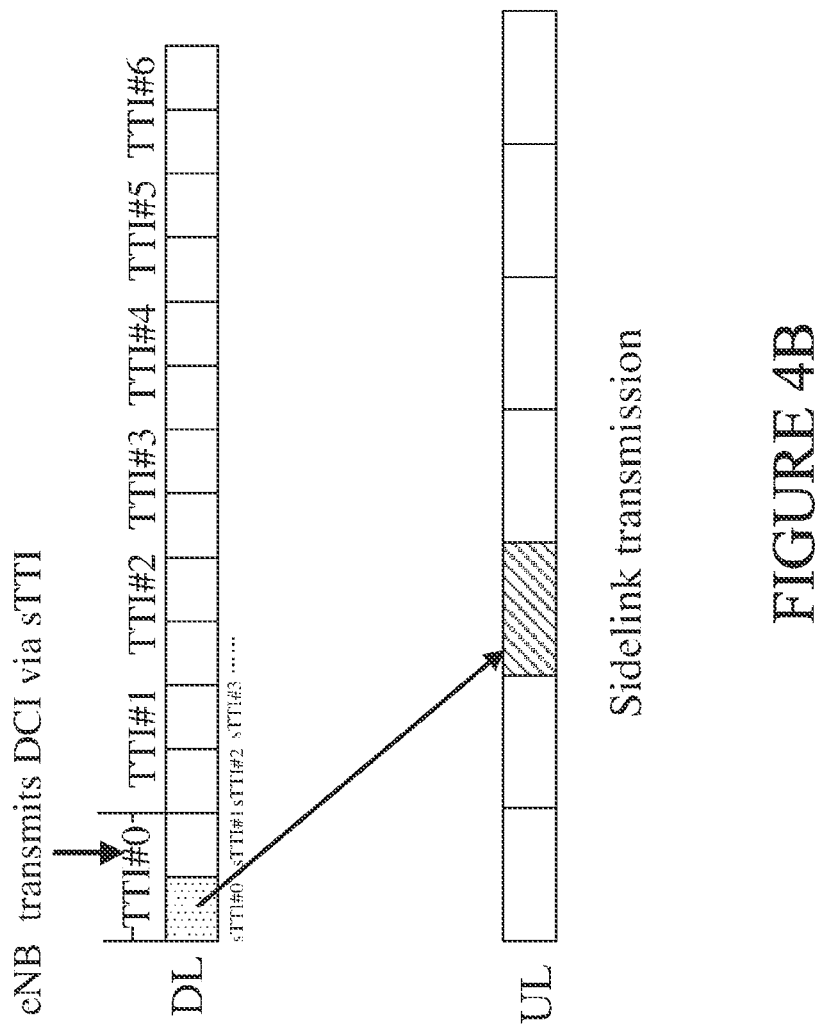
FIG. 4B schematically shows a signaling interaction of a base station and a user equipment for sidelink transmission using shortened transmission time interval (sTTI) according to another embodiment of the present disclosure.

FIG. 4B schematically shows a signaling interaction of a base station and a user equipment for sidelink transmission using shortened transmission time interval (sTTI) that is implicitly indicated by the first control information according to another embodiment of the present disclosure.

The embodiment shown in FIG. 4B is exemplary for mode 3 in LTE-V2X. As shown in FIG. 4B, a base station, e.g., eNB, may schedule sidelink transmission for a UE, e.g., UE 200 shown in FIG. 2.

As shown in the example of FIG. 4B, the eNB transmits first control information, such as DCI using sTTI, at sTTI#0. The determination circuitry 230 in the UE 200 determines whether TTI or sTTI is used for the signaling interaction based on the received first control information, e.g., DCI. For example, the determination circuitry 230 determines that sTTI is used for the signaling interaction when the receiver 210 receives the DCI within a control resource that is specially specified for the sTTI. In another embodiment, when the receiver receives the downlink control information within a control resource that is shared by both of sTTI and the TTI, the determination circuitry 230 may determine whether TTI or sTTI is used for the signaling interaction according to a size of received DCI. For example, if the size of the received DCI is not greater than a predetermined size, the determination circuitry 230 determines that sTTI is used for the signaling interaction. In another embodiment, the determination circuitry 230 may also determine whether TTI or sTTI is used for the signaling interaction according to a search space, e.g., a location of the search space.

In the example of FIG. 4B, the determination circuitry 230 determines that sTTI is used for signaling interaction. Then the transmitter 250 of the UE 200 transmits second control information using sTTI for interacting with the eNB, and sTTI is used for the signaling interaction of the UE 200 and the eNB for sidelink transmission. As shown in the example of FIG. 4B, 4 sTTIs (e.g. sTTI#0~sTTI#3 corresponding to TTI#0~TTI#2 if sTTI is a half of the length of TTI) are used for signaling interaction of the UE and the base station via uplink and downlink for scheduling sidelink transmission. At TTI#2, the UE 200 performs sidelink transmission. FIG. 4B is only for illustrative purpose, and the signaling interaction latency is variable according to practical application, and the UE 200 may perform sidelink transmission at other times (e.g., TTI#n, and n is an integer).

As shown in FIG. 4B, the length of sTTI is a half of the length of TTI, that is, sTTI length equals to 0.5 ms, and the overall latency of the signaling interaction may be reduced by a half compared with using TTI in the whole signaling interaction process, therefore, the latency of the signaling interaction of UE and base station is greatly reduced. Although the length of sTTI shown in FIG. 4B is a half of the length of TTI, that is, sTTI includes 7 OFDM of 14 OFDM symbols in TTI, the embodiment shown in FIG. 4B is only for illustrative purposes, and the length of sTTI can be varied depending on the latency requirements of particular applications.

In addition, by using implicit configuration of using TTI or sTTI for the signaling interaction, the RRC signaling can be avoided, which saves resources of the communication system.

In practical applications, due to backward compatibility consideration in LTE-V2X, the sidelink transmission after the signaling interaction still uses TTI for communication among different UEs.

Referring back to FIG. 2, in one embodiment, the UE 200 may be a UE in New Radio system, in that case, the shortened time interval is referred to as mini-slot (or non-slot unit) in the New Radio system, the standard time interval is referred to as slot in the New Radio system, and wherein mini-slot or non-slot unit is a fraction of slot in terms of OFDM symbol. For example, mini-slot or non-slot unit may correspond to at least one OFDM symbol in a slot. But this is not a limitation, and other lengths of mini-slots are available, as long as the length of mini-slot is shorter than the length of the slot. The user equipment 200 transmits second control information during the signaling interaction to the base station (e.g., gNB) using mini-slot (or non-slot unit) after determining that the mini-slot or non-slot unit is used for the signaling interaction. In addition, as there is no need to consider backward compatibility of UE in NR, the user equipment 200 may further perform sidelink transmission using the mini-slot or the non-slot unit after determining that the mini-slot or the non-slot unit is used for the signaling interaction in the New Radio system.

Whether using mini-slot or slot unit for the signaling interaction may be indicated explicitly or implicitly by transmitting the control information by the gNB. The determination circuitry 230 of the UE 200 determines whether mini-slot or slot is used for the signaling interaction according to the received control information. More specifically, for the explicit indication by transmitting the control information, which may include RRC, DCI, or a combination thereof, the determination circuitry 230 determines whether the mini-slot or slot is used for the signaling interaction according to one or more of radio resource control (RRC) signaling and the downlink control information (DCI). For the implicit indication by transmitting the control information, when the receiver 210 receives the first control information (e.g., DCI) within a control resource that is specially specified for the shortened time interval, the determination circuitry 230 determines that the mini-slot or non-slot unit is used for the signaling interaction. When the receiver 210 of UE 200 receives the first control information (e.g., DCI) within a control resource that is shared by the mini-slot or non-slot unit and the slot, the determination circuitry 230 determines whether the mini-slot is used for the signaling interaction according to one or more of a search space in the user equipment and a size of the downlink control information (DCI).

Figure 5A:
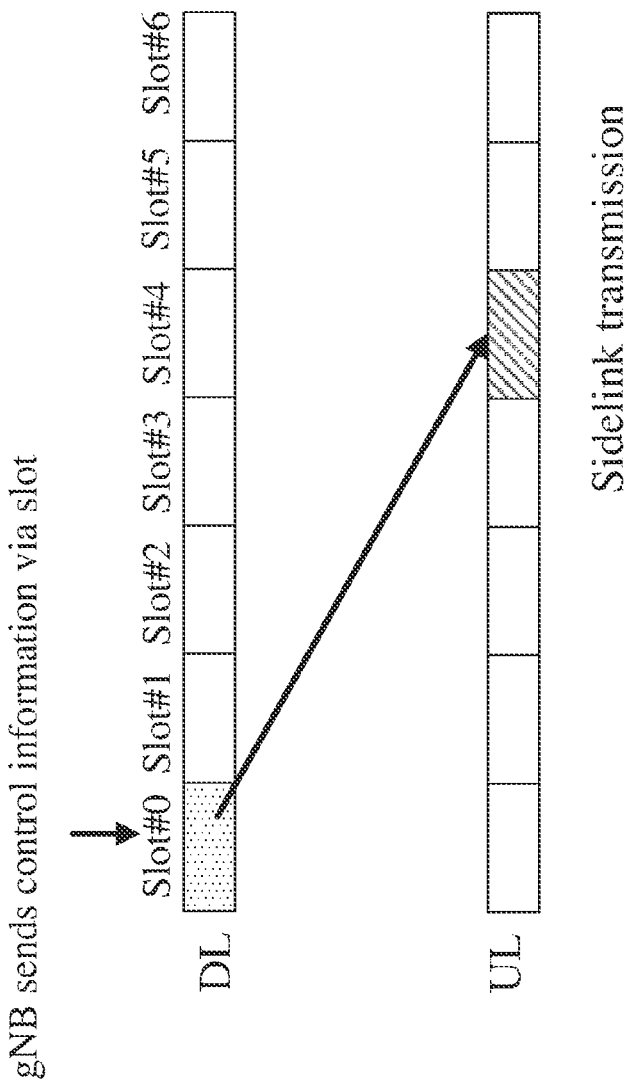
FIG. 5A schematically shows a signaling interaction of a base station and a user equipment for sidelink transmission using slot according to another embodiment of the present disclosure.
Figure 5B:
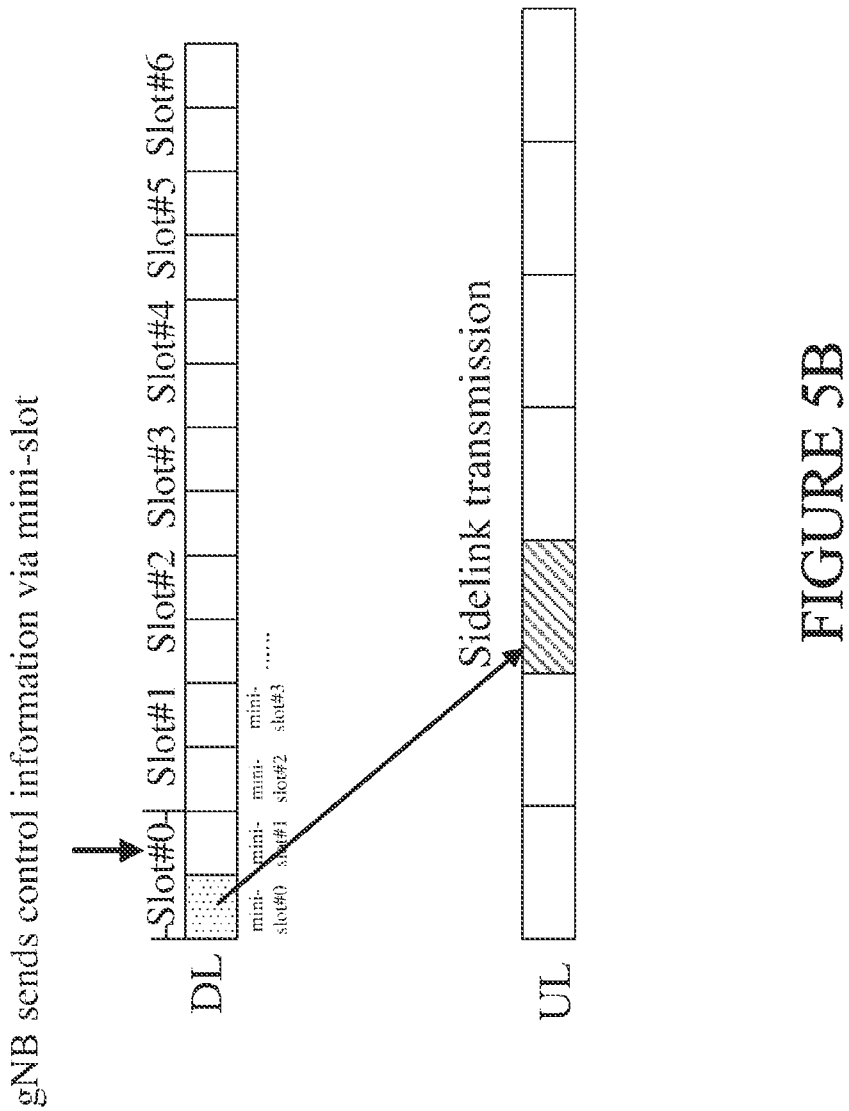
FIG. 5B schematically shows a signaling interaction of a base station and a user equipment for sidelink transmission using mini-slot according to another embodiment of the present disclosure.

FIG. 5A schematically shows a signaling interaction of a base station and a user equipment for sidelink transmission using slot in New Radio (NR) system, which is referred as "scheduling based on DMRS type A", according to another embodiment of the present disclosure, and FIG. 5B schematically shows a signaling interaction of a base station and a user equipment for sidelink transmission using mini-slot in NR system, which is referred as "scheduling based on DMRS type B" according to another embodiment of the present disclosure. FIGS. 5A-5B differ from FIGS. 3A-4B in that the slots in FIGS. 5A-5B correspond to TTI in FIG. 3A-4B, and mini-slots in FIGS. 5A-5B correspond to sTTI in FIGS. 3A-4B. The operations in FIGS. 5A-5B are similar with that shown in FIG. 3A-4B, hence repetitive description are omitted here for the purpose of clarity and brevity.

It should be understood that FIGS. 3A-5B are only examples and for the purpose of illustration, but not a limitation. Although sidelink transmission uses uplink carriers as shown in FIGS. 3A-5B, the embodiments shown in FIGS. 3A-5B are only for illustrative purposes, and the sidelink transmission may also use dedicated carries (e.g., sidelink dedicated carriers or intelligent Transportation System (ITS) dedicated carriers) in another embodiment, and the operation of sidelink transmission using dedicated carries is similar with that of using uplink carriers, hence the repetitive description is omitted here for purposes of clarity and brevity.

Figure 6:
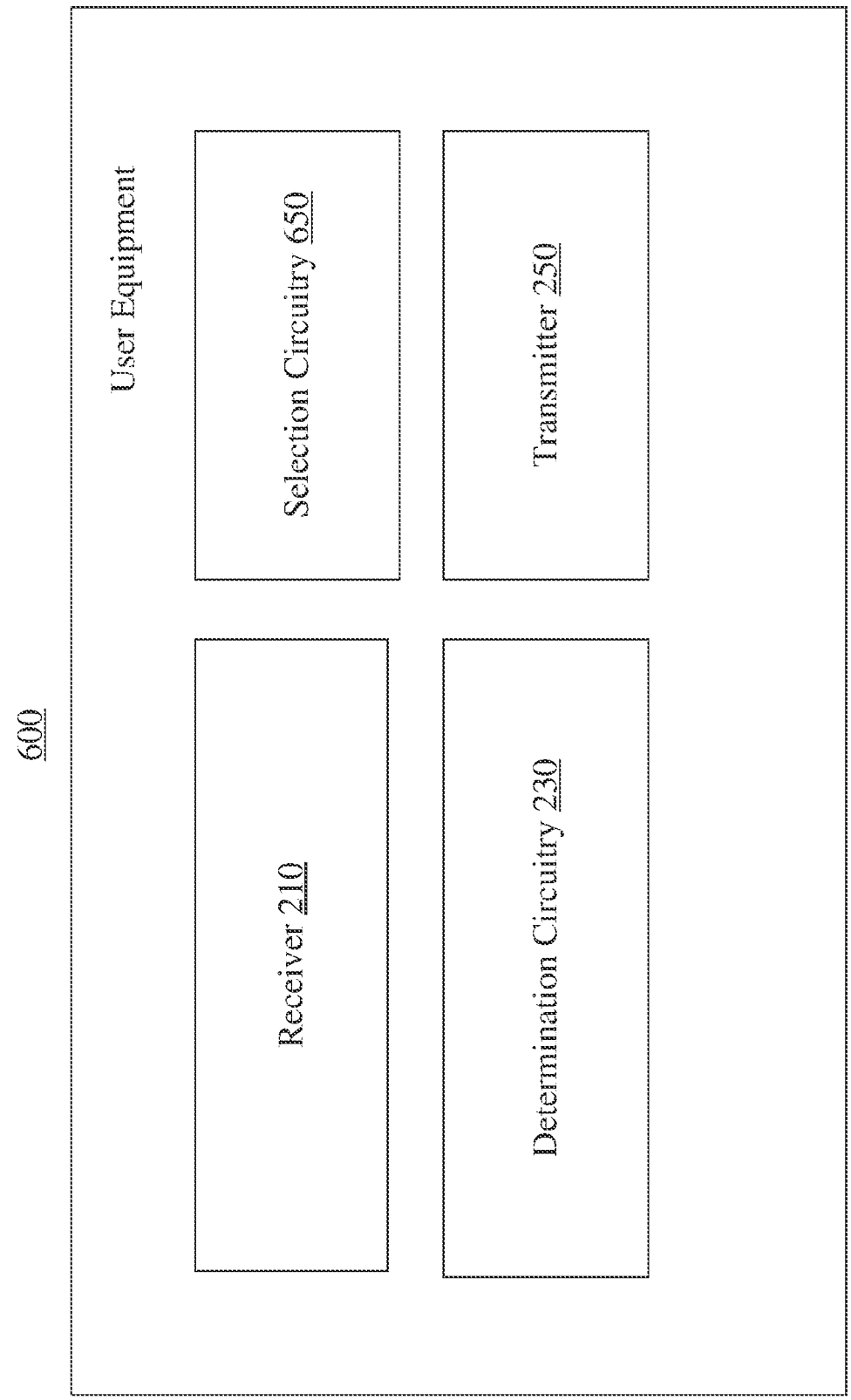
FIG. 6 schematically shows a block diagram of an example of a user equipment according to an embodiment of the present disclosure.

FIG. 6 schematically shows a block diagram of an example of a user equipment 600 according to an embodiment of the present disclosure. The user equipment 600 includes a receiver 210, determination circuitry 230, a transmitter 250, and selection circuitry 650. The elements and configuration of receiver 210, determination circuitry 230, and transmitter 250 are the same as shown in FIG. 2. Therefore, elements having similar functions as shown in FIG. 2 are labeled with the same reference number and will not be repetitively described herein for purpose of brevity and clarity.

In an embodiment, the UE 200 may be a UE in LTE-V2X system, in that condition, the shortened time interval is a shortened transmission time interval (sTTI), the standard time interval is a transmission time interval (TTI). In another embodiment, the user equipment 600 may be a UE in New Radio system, in that case, the shortened time interval is mini-slot (or non-slot) unit in the New Radio system, the standard time interval is slot in the New Radio system.

In an embodiment, the selection circuitry 650 may select the shortened time interval (e.g., sTTI in LTE, and mini-slot or non-slot unit in NR) or the standard time interval (e.g., TTI in LTE, and slot in NR) for the signaling interaction of the user equipment 600 and the base station (eNB in LTE and gNB in NR) for sidelink transmission. And the transmitter 250 transmits a report indicating the selected time interval for the signaling interaction via one or more of scheduling request (SR) and buffer-status report (BSR).

In an embodiment, the UE 600 uses SR (via its content or transmission resource) to report recommended or selected time interval, which is whether to use the shortened time interval or the standard time interval for the signaling interaction. In an embodiment, SR includes normal SR and sidelink SR depending on resources for transmitting the SR. And the sidelink SR further includes SR for standard time interval and SR for shortened time interval. If the UE 600 selects using the shortened time interval for signaling interaction, the transmitter 250 of UE 600 may transmit the report using sidelink SR for shortened time interval. For the base station, the base station receives the report and acquires the selected time interval according to the received SR. For example, when the base station determines that the SR is received within a control resource specified for the sidelink SR and the SR is further for the shortened time interval, the base station acknowledges that the user equipment 650 selects the shortened time interval for the signaling interaction for sidelink transmission.

The base station may further decide whether to use the selected shortened time interval or not for the signaling interaction. When deciding using the selected shortened time interval, the base station (eNB/gNB) transmits DCI or RRC to the UE 600 to indicate whether to use the shortened time interval for the signaling interaction.

In another embodiment, the UE 600 uses BSR (via its content or transmission resource) to report recommended or selected time interval length, which is whether to use the shortened time interval or the standard time interval for the signaling interaction. In an embodiment, BSR includes normal BSR and sidelink BSR depending on resources for transmitting the BSR. And the sidelink BSR further includes BSR for standard time interval and BSR for shortened time interval. If the UE 600 selects using the shortened time interval for signaling interaction, the transmitter 250 of the UE 600 may transmit the report using sidelink BSR for shortened time interval. For the base station, the base station receives the report and acquires the selected time interval length according to the received BSR. For example, when the base station determines that the BSR is received within a control resource specified for the sidelink and the BSR further is for the shortened time interval, the base station acknowledges that the UE 600 selects the shortened time interval.

In another embodiment, the UE 600 may further select the length of the shortened time interval by configuring BSR and transmitting the BSR to the base station. And the base station may acknowledge the recommended length of the shortened time interval according to the resource and content of the received BSR.

The base station may further decide whether to use the selected shortened time interval or not. And the base station (eNB/gNB) transmits control information to the UE 600 to indicate whether to use the shortened time interval or the standard time interval for the signaling interaction. And the UE 600 may determine whether the shortened time interval is used for the signaling interaction according to the determining scheme as mentioned-above.

In another embodiment, the base station may transmit control information (like DCI format 5A in LTE) or sidelink scheduling assignment (PSCCH or PSBCH) indicating which TTI length is used for sidelink transmission. Especially the sidelink scheduling assignment based approach may be used for both mode 3 in LTE (eNB based sidelink transmission) and mode 4, in which UE autonomously schedules.

In an embodiment, the first control information transmitted by the base station includes sidelink related downlink control information (DCI), for example, the DCI that is transmitted by the base station after receiving BSR from the UE. And the time of transmitting sidelink transmission by the user equipment is not earlier than a first time determined according to one of the following equations a) and b):

$$T_{DL} - \frac{N_{TA}}{2} \times Ts + m \times 10^{-3} + Y \times S \quad \text{a)}$$

$$T_{DL} - \frac{N_{TA}}{2} \times Ts + (X + m) \times 10^{-3} \quad \text{b)}$$

Wherein $$T_{DL} - \frac{N_{TA}}{2} \times Ts$$

indicates the time that base station transmits sidelink related DCI, m indicates a time offset, S indicates the length of the shortened time interval in second (s), and X and Y relate to capacity of the user equipment and are configured by RRC or predetermined.

Figure 7:
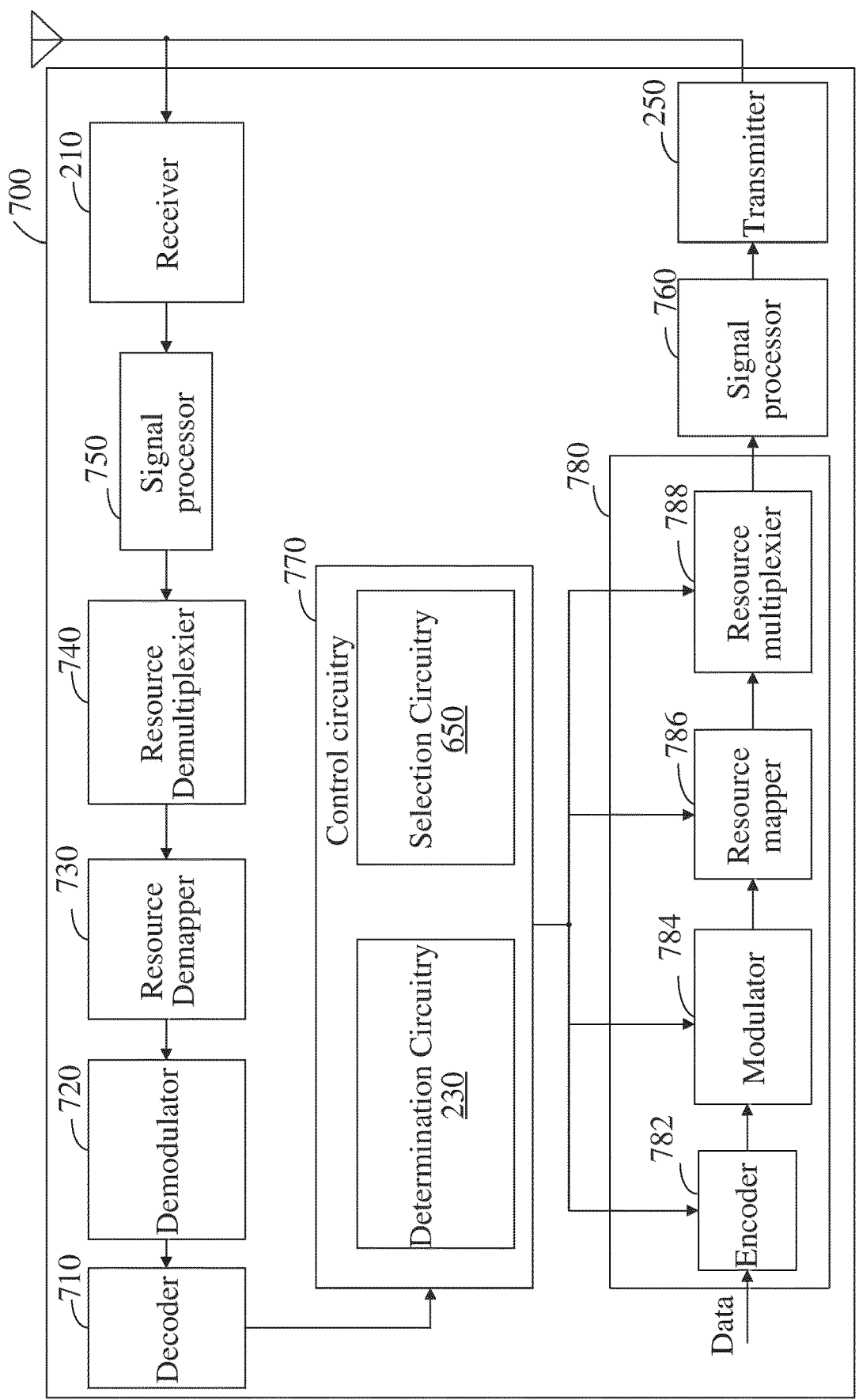
FIG. 7 schematically shows a block diagram illustrating details of the user equipment according to an embodiment of the present invention.

FIG. 7 schematically shows a block diagram illustrating details of the user equipment 700 according to an embodiment of the present invention. As shown in FIG. 7, the UE 700 includes a decoder 710, a demodulator 720, a resource demapper 730, a resource demultiplexier 740, a first signal processor 750, a second signal processor 760, processing circuitry 780 including an encoder 782, a modulator 784, a resource mapper 786, and a resource multiplexer 788, a receiver 210, control circuit 770 including determination circuitry 230 and selection circuitry 650, and a transmitter 250. The elements and configuration of receiver 210, determination circuitry 230, and transmitter 250 are the same as shown in FIG. 2. Therefore, elements having similar functions as shown in FIG. 2 are labeled with the same reference number and will not be repetitively described herein for purpose of brevity and clarity.

In one embodiment, the UE 700 may be a UE in LTE-V2X system, in that condition, the shortened time interval is a shortened transmission time interval (sTTI), the standard time interval is a transmission time interval (TTI), and sTTI is a fraction of TTI in terms of OFDM symbol. The signaling interaction of the UE 700 and the base station, e.g. eNB, may use sTTI.

In another embodiment, the UE 700 may be a UE in New Radio system, in that case, the shortened time interval is mini-slot (or non-slot unit) in the New Radio system, the standard time interval is slot in the New Radio system, and wherein mini-slot or non-slot unit is a fraction of slot in terms of OFDM symbol. The signaling interaction of the UE 700 and the base station, e.g. gNB, may use mini-slot. In addition the sidelink transmission may also use mini-slot among UEs.

The receiver 210 receives the radio signals via antennas. The first signal processor 750 processes the received signals, the resource demultiplexier 740 demultiplexes resources transmitting the first control information and data, and sends the demultiplexed control information to the resource demapper 730 for demapping resources for the first control information, and the demodulator 720 demodulates the first control information to generate demodulated first control information. The decoder 710 decodes the demodulated first control information and sends the decoded information to the control circuitry 770.

In an embodiment, determination circuitry 230 in the control circuitry 770 receives the decoded control information and determines whether a shortened time interval is used for the signaling interaction of the user equipment and the base station according to the received control information. The operation of the determination circuitry 230 has been described above and hence repetitive description is omitted here for the purposes of clarity and brevity.

After the determination circuitry 230 determines that the shortened time interval is used for the signaling interaction, the control circuitry 770 may control the transmitter 250 to transmit second control information during the signaling interaction using the shortened time interval. The control circuitry 770 may generate the second control information and sends the second control information (SR or BSR, for example) and a control signal to the processing circuitry 780. The encoder 782 encodes the second control information, the modulator 784 modulates the second control information, the resource mapper 786 maps the second control information to a specified resource, and the resource multiplexier 788 multiplexes the second control information with data for assigning a specified resource to the control information and the data. After being processed by the second signal processor 760, the processed second control information is transmitted using the shortened time interval for signaling interaction with the base station.

The control circuitry 770 shown in FIG. 7 is only an example and for the purpose of illustration, but not a limitation, the control circuitry 770 may also include other circuits, e.g., circuitry for controlling the elements mentioned-above, according to configuration of the user equipment.

To be noted that although FIG. 7 is only an example and for the purpose of illustration, but not a limitation, in fact, for example, one or more of the integrated parts may be includes in the UE 700 depending on requirements of the communication system.

Figure 8:
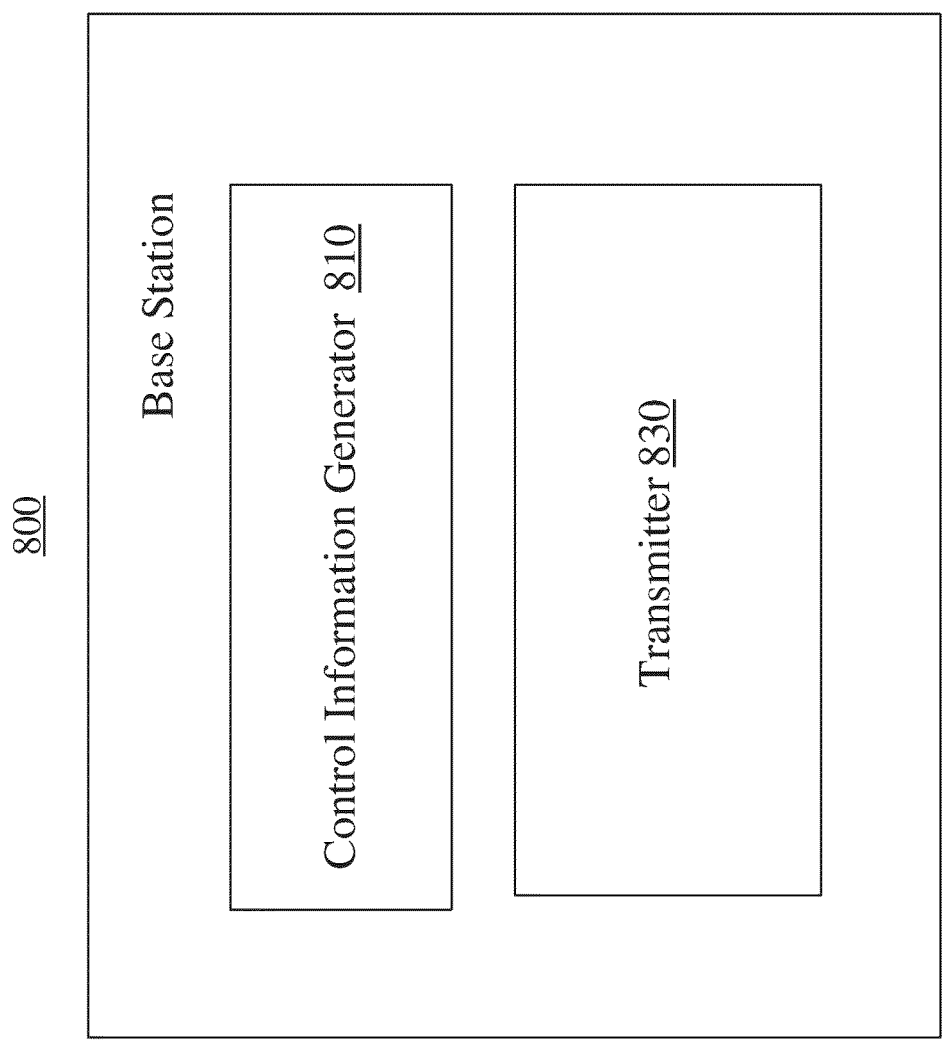
FIG. 8 schematically shows a block diagram of an example of a base station according to an embodiment of the present disclosure.

FIG. 8 schematically shows a block diagram of an example of a base station 800 according to an embodiment of the present disclosure. In an embodiment, the base station shown in FIG. 8 may schedule sidelink transmission for a user equipment (UE).

The base station 800 shown in FIG. 8 includes a control information generator 810 and a transmitter 830. The control information generator 810 may generate first control information, and the transmitter 830 may transmit the first control information to a user equipment to indicate whether to use a shortened time interval for a signaling interaction of the base station and the user equipment for sidelink transmission, wherein a length of the shortened time interval is less than a length of a standard time interval.

In an embodiment, the base station 800 may be an eNB in LTE, and in that case, the shortened time interval is a shortened transmission time interval (sTTI), the standard time interval is a transmission time interval (TTI), and sTTI is a fraction of TTI in terms of OFDM symbol. In an embodiment, the UE transmits second control information to the base station, e.g., eNB during the signaling interaction using sTTI after determining that the sTTI is used for the signaling interaction.

In an embodiment, the base station 800 may be gNB in NR system, and in that case, the shortened time interval is mini-slot (or non-slot unit) in the NR system, the standard time interval is slot in the NR system, and wherein mini-slot or non-slot unit is a fraction of slot in terms of OFDM symbol. In an embodiment, the user equipment transmits second control information during the signaling interaction to the base station, e.g., gNB using mini-slot or non-slot unit after determining that the mini-slot or non-slot unit is used for the signaling interaction. In addition, after the user equipment determines that the mini-slot or the non-slot unit is used for the signaling interaction in the NR system, the user equipment performs sidelink transmission using the mini-slot or the non-slot unit.

In an embodiment, the first control information comprises one or more of downlink control information (DCI) and radio resource control (RRC) signaling, and whether to use the shortened time interval for the signaling interaction is explicitly indicated by one or more of radio resource control (RRC) signaling and the downlink control information. And a determination circuitry 230 of the UE as mentioned above may determine whether the shortened time interval or the standard time interval is used for the signaling interaction according to one or more of RRC signaling and the DCI, the detailed of which has been described above with combination of FIGS. 3A-3B and FIGS. 5A-5B, and hence the repetitively description is omitted here for the purposes of clarity and brevity.

In an embodiment, when the user equipment receives the first control information within a control resource that is specially specified for the shortened time interval, the determination circuitry 230 of user equipment determines that the shortened time interval is used for the signaling interaction, the detailed of which has been described above with combination of FIGS. 4A-4B and FIGS. 5A-5B, and hence the repetitively description is omitted here for the purposes of clarity and brevity.

In an embodiment, the first control information includes downlink control information (DCI), and when the user equipment receives the downlink control information within a control resource that is shared by the shortened time interval and the standard time interval, the determination circuitry referred to as circuitry 230 of the user equipment determines whether the shortened time interval or the standard time interval is used for the signaling interaction according to one or more of a search space in the user equipment and a size of the downlink control information. The operation of determination circuitry 230 has been described above with combination of FIGS. 4A-4B and FIGS. 5A-5B, and hence the repetitively description is omitted here for the purposes of clarity and brevity.

In one embodiment, the base station may further include a controller (e.g., a controller 1052 shown in FIG. 10) to control resource assignment (e.g., time interval used for transmitting the first control information) for the first control information to be transmitted, and to control the time interval that is used for the signaling transmission. For example, the controller may control the transmitter 830 to transmit the first control information in standard time interval (e.g., TTI in LTE or slot in NR) or in shortened time interval (e.g., sTTI in LTE or mini-slot in NR). And the transmitter 830 further transmits the first control information to the UE to indicate whether the shortened time interval or a standard time interval is used for the signal interaction. In an embodiment, the controller may control the length of the shortened time interval when the shortened time interval is used for the signaling interaction.

Figure 9:
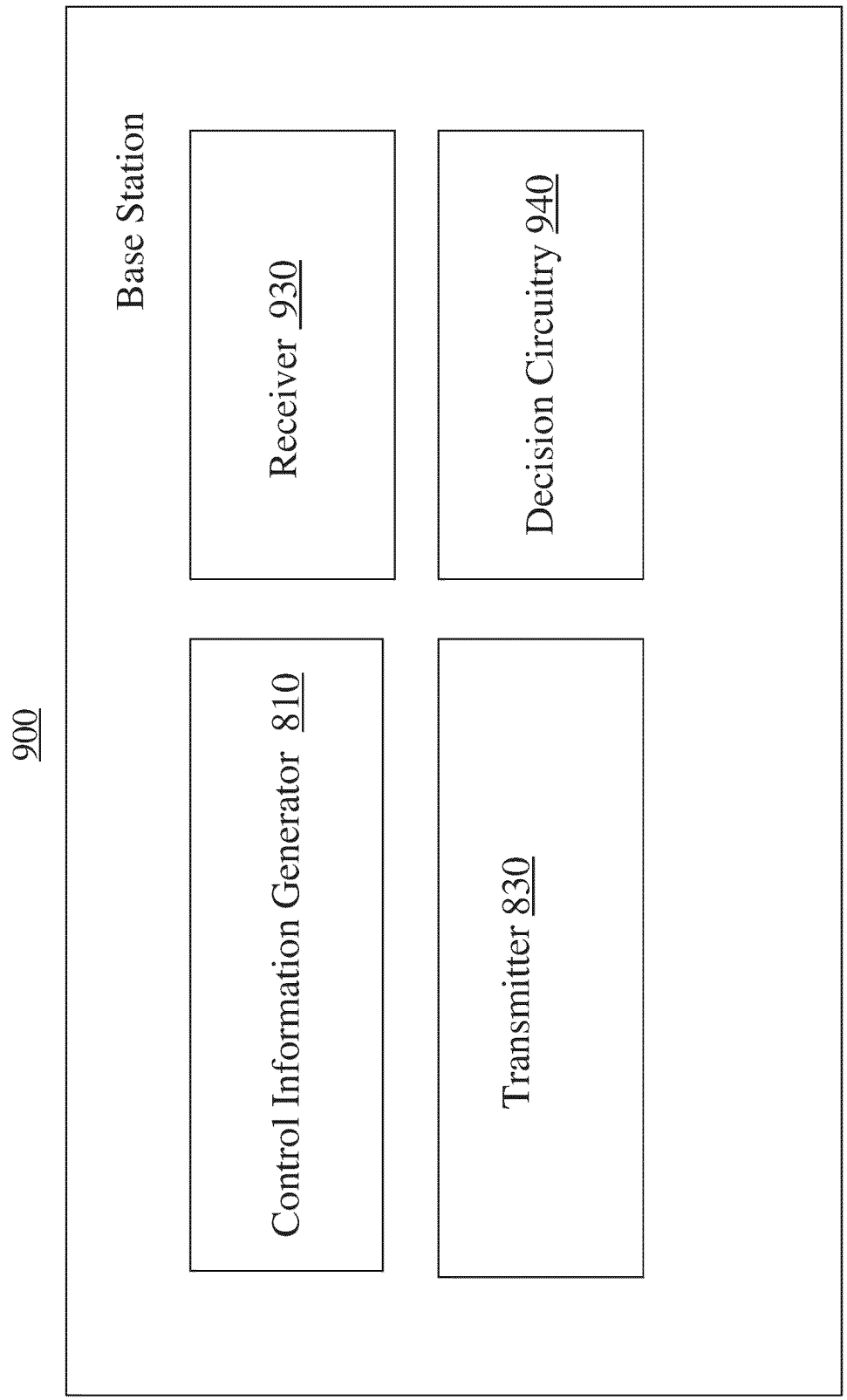
FIG. 9 schematically shows a block diagram of an example of a base station according to an embodiment of the present disclosure.

FIG. 9 schematically shows a block diagram of an example of a base station 900 according to an embodiment of the present disclosure. The base station 900 includes the control information generator 810, the transmitter 830, a receiver 930, and decision circuitry 940. The elements and configuration of the control information generator 810 and transmitter 830 are the same as shown in FIG. 8. Therefore, elements having similar functions as shown in FIG. 8 are labeled with the same reference number and will not be repetitively described herein for purpose of brevity and clarity.

In an embodiment, the receiver 930 receives a report from the user equipment via one or more of scheduling request and buffer-status report, wherein the report is indicative of a time interval selected by the user equipment for the signaling interaction. The decision circuitry 940 decides whether to use the time interval selected by the user equipment for the signaling interaction with the user equipment.

As mentioned above with reference to FIG. 6, the transmitter 250 of the UE 600 transmits the report indicating the selected time interval (e.g., shortened time interval or standard time interval) for the signaling interaction via one or more of scheduling request (SR) and buffer-status report (BSR). The decision circuitry 940 of the base station acknowledges the time interval selected and recommended by the user equipment 650 and decides whether to use the selected time interval or not. The operation of the decision circuitry 940 has been described above with reference to FIG. 6 and repetitively description is omitted here for the purposes of clarity and brevity.

After deciding using the shortened time interval selected by the UE, the base station (eNB/gNB) 900 transmits DCI to indicate that the shortened time interval is used for the signaling interaction, and after deciding using the standard time interval selected by the UE, the base station 900 transmits DCI to indicate that the standard time interval is used for the signaling interaction.

In one embodiment, the base station may further include a controller (e.g., a controller 1052 shown in FIG. 10) to control resource assignment (e.g., time interval used for transmitting the first control information) for the first control information to be transmitted, and to control the time interval that is used for the signaling transmission, e.g., according to decision information made by the decision circuitry 940 when the base station 900 receives the report from the UE. For example, the controller may control the transmitter 830 to transmit the first control information in standard time interval (e.g., TTI in LTE or slot in NR) or in shortened time interval (e.g., sTTI in LTE or mini-slot in NR). And the transmitter 830 further transmits the first control information to the UE to indicate whether the shortened time interval or a standard time interval is used for the signal interaction. In an embodiment, the controller may control the length of the shortened time interval when the shortened time interval is used for the signaling interaction.

In another embodiment, the base station 900 may transmit control information (like DCI format 5A in LTE) or sidelink scheduling assignment (PSCCH or PSBCH) indicating which TTI length (e.g., TTI or sTTI) is used for sidelink transmission. Especially the sidelink scheduling assignment based approach may be used for both mode 3 in LTE (eNB based sidelink transmission) and mode 4, in which UE autonomously schedules.

In an embodiment, the first control information transmitted by the base station includes sidelink related downlink control information (DCI), for example, the DCI that are transmitted after receiving BSR from the UE. And the time of transmitting sidelink transmission by the user equipment is not earlier than a first time determined according to one of the following equations a) and b):

$$T_{DL} - \frac{N_{TA}}{2} \times Ts + m \times 10^{-3} + Y \times S \quad \text{a)}$$

$$T_{DL} - \frac{N_{TA}}{2} \times Ts + (X + m) \times 10^{-3} \quad \text{b)}$$

Wherein $$T_{DL} - \frac{N_{TA}}{2} \times Ts$$

indicates the time that base station 900 transmits sidelink related DCI, m indicates a time offset, S indicates the length of the shortened time interval in second (s), and X and Y relate to capacity of the user equipment and are configured by RRC or predetermined.

Figure 10:
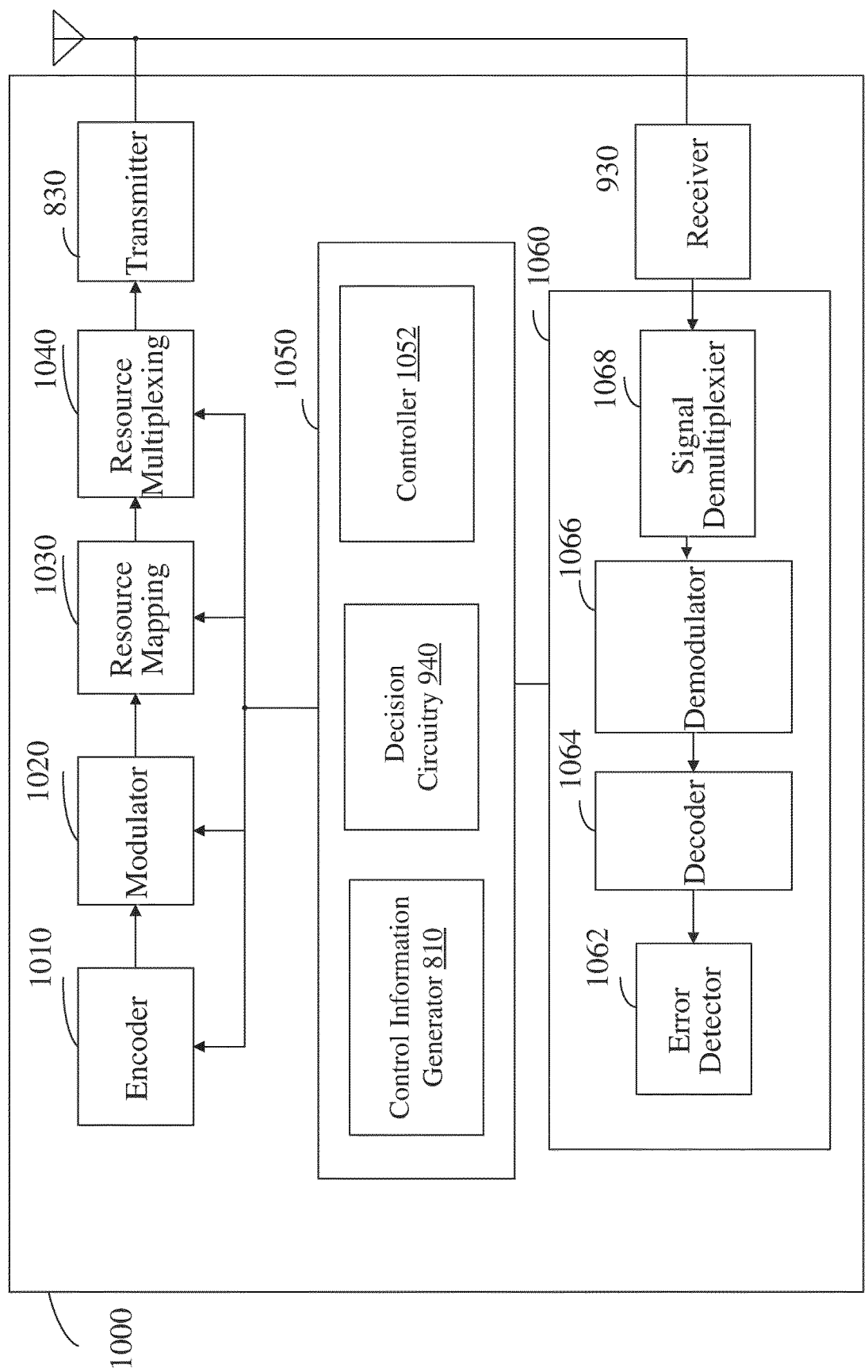
FIG. 10 schematically shows a block diagram illustrating details of a base station according to an embodiment of the present invention.

FIG. 10 schematically shows a block diagram illustrating details of a base station 1000 according to an embodiment of the present invention. As shown in FIG. 10, the base station 1000 includes a processing circuit 1060 including an error detector 1062, a decoder 1064, and a demodulator 1066, a signal demultiplexier 1068, an encoder 1010, a modulator 1020, a resource mapper 1030, a resource multiplexier 1040, control circuitry 1050 including the decision circuitry 940, a controller 1052, and the control information generator 810, a transmitter 830, and a receiver 930. The elements and configuration of the receiver 930, the decision circuitry 940, the control information generator 810, and the transmitter 830 are the same as shown in FIG. 9. Therefore, elements having similar functions as shown in FIG. 9 are labeled with the same reference number and will not be repetitively described herein for purpose of brevity and clarity.

The control information generator 810 generates the first control information, the encoder 1010 receives the first information from the control information generator 810, encodes the first control information and sends the encoded first control information to the modulator 1020 for modulation. The resource mapper 1030 maps the modulated first control information with a specified resource, and the resource multiplexier 1040 multiplexes the first control information with data for transmission.

In an embodiment, the transmitter 830 transmits the first control information to the user equipment to indicate whether to use a shortened time interval for a signaling interaction of the base station and the user equipment for sidelink transmission.

In an embodiment, the receiver 930 receives a report via SR or BSR from the UE, such as UE 600 as shown in FIG. 6. The report is indicative of a time interval selected by the user equipment for the signaling interaction. For example, the UE may select shortened time interval or standard time interval for the signaling interaction with the base station 1000. The report is demultiplexed by the signal demultiplexier 1068 using Fast Fourier Transform (FFT), and the demultiplexed report is sent to the demodulator 1066 for demodulation. The demodulated report is sent to the decoder 1064 for decoding and the error detector 1062 checks if there is any error in the report. The checked report is sent to the decision circuitry 940 in the control circuitry 1050 for deciding whether to use the time interval selected by the user equipment for the signaling interaction. The detailed operation of the decision circuitry 940 has been described above and will be omitted herein for the purposes of clarity and brevity.

The controller 1052 in the control circuitry 1050 may control resource assignment (e.g., time interval used for transmitting the first control information) for the first control information to be transmitted, and control the time interval that is used for the signaling transmission. In an embodiment, when the base station 1000 receives the report from the UE, the controller 1052 may control the time interval that is used for the signaling transmission according to decision information made by the decision circuitry 940. For example, the controller 1052 may control the transmitter 830 to transmit the first control information in standard time interval (e.g., TTI in LTE or slot in NR) or in shortened time interval (e.g., sTTI in LTE or mini-slot in NR). And the transmitter 830 further transmits the first control information to the UE to indicate whether the shortened time interval or a standard time interval is used for the signal interaction. In an embodiment, the controller 1052 may further control the length of the shortened time interval when the shortened time interval is used for the signaling interaction.

The control circuitry 1050 shown in FIG. 10 is only an example and for the purpose of illustration, but not a limitation, the control circuitry 1050 may also include other circuits, e.g., circuitry for controlling the elements mentioned-above, according to configuration of the base station 1000.

It should be understood that FIG. 10 is only an example and for the purpose of illustration, but not a limitation, in fact, for example, one or more of the integrated parts may be includes in the base station 1000 depending on requirements of the communication system.

Figure 11:
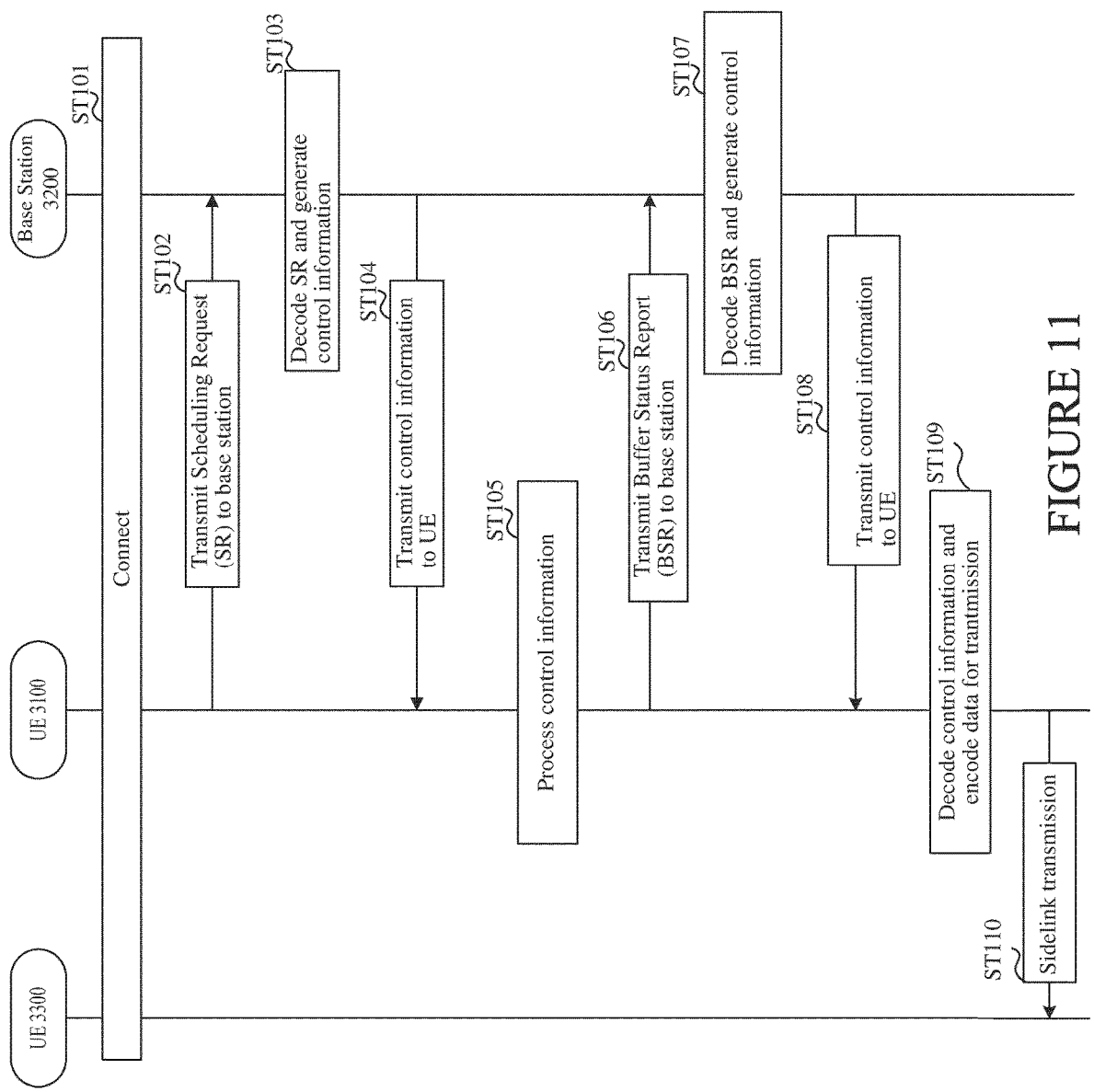
FIG. 11 schematically shows an example of a flowchart of signaling interaction of a user equipment and a base station for sidelink transmission according to an embodiment of the present disclosure.

FIG. 11 schematically shows an example of a flowchart of communication between a user equipment and a base station according to an embodiment of the present disclosure. The UE 3300 may be a UE having similar configuration or different configuration with UE 3100. The UE 3100 interacts signaling with the base station before performing sidelink transmission with the UE 3300. FIG. 11 will be described in combination with FIG. 2, FIG. 6, and FIGS. 8-9.

In an embodiment, the flowchart may be applied in LTE, in that case, the base station includes eNB, and the shortened time interval is a shortened transmission time interval (sTTI), the standard time interval is a transmission time interval (TTI), and sTTI is a fraction of TTI in terms of OFDM symbol. In another embodiment, the flowchart may be applied in NR, in that case, the base station includes gNB, and in that case, the shortened time interval is mini-slot (or non-slot unit) in the New Radio system, the standard time interval is slot in the New Radio system, and wherein mini-slot or non-slot is a fraction of slot in terms of OFDM symbol.

At step ST101, the UE 3100 connects with the base station 3200 in a connection procedure. The connection may be established by implementing known or future developed method whose details are omitted herein.

At step ST102, the UE 3100 transmits SR to the base station. In an embodiment, the SR may be a normal SR for interacting signaling with the base station 3200. In an embodiment, when the UE 3100 selects the shortened time interval (e.g., sTTI in LTE, and mini-slot or non-slot unit in NR) or the standard time interval (e.g., TTI in LTE, and slot in NR) for the signaling interaction for the signaling interaction, SR may be sidelink SR for the shortened time interval and indicates the time interval selected by the UE 3100.

At step ST103, the base station 3200 decodes the received SR and generates control information. In an embodiment, when the SR is sidelink SR for the shortened time interval, the base station 3200 may acknowledge the time interval selected by the UE at step ST103 for signaling interaction, and the base station further determines if using the selected time interval for the signaling interaction of the base station and the UE 3100.

At step ST104, the base station 3200 transmits the control information to UE 3100. In an embodiment, the base station 3200 transmits the control information to indicate whether to use the shortened time interval for the signaling interaction.

At step ST105, the UE 3100 receives the control information and processes the received control information.

In an embodiment, the control information transmitted at step ST104 includes one or more of downlink control information (DCI) and radio resource control (RRC) signaling, and whether to use the shortened time interval for the signaling interaction is explicitly indicated by one or more of radio resource control (RRC) signaling and the downlink control information.

And a determination circuitry 230 of the UE 3100 may determine whether the shortened time interval or the standard time interval is used for the signaling interaction according to one or more of RRC signaling and the DCI at step ST105, the detailed of which has been described above with combination of FIGS. 3A-3B and FIGS. 5A-5B, and hence the repetitively description is omitted here for the purposes of clarity and brevity.

In an embodiment, at step ST105, when the user equipment 3100 receives the first control information within a control resource that is specially specified for the shortened time interval, the determination circuitry 230 of user equipment 3100 determines that the shortened time interval is used for the signaling interaction, the detailed of which has been described above with combination of FIGS. 4A-4B and FIGS. 5A-5B, and hence the repetitively description is omitted here for the purposes of clarity and brevity.

In an embodiment, the first control information transmitted at step ST104 includes downlink control information, and when the user equipment 3100 receives the downlink control information within a control resource that is shared by the shortened time interval and the standard time interval at step ST105, the determination circuitry 230 of the user equipment 3100 determines whether the shortened time interval or the standard time interval is used for the signaling interaction according to one or more of a search space in the user equipment and a size of the downlink control information. The operation of determination circuitry 230 has been described above with combination of FIGS. 4A-4B and FIG. 5A-5B, and hence the repetitively description is omitted here for the purposes of clarity and brevity.

At step ST106, the UE 3100 transmits the BSR to the base station. In an embodiment, the UE 3100 transmits the BSR using the shortened time interval when the UE 3100 determines that the shortened time interval is used for the signaling interaction. In yet another embodiment, when UE 3100 selects the shortened time interval (e.g., sTTI in LTE, and mini-slot or non-slot unit in NR) or the standard time interval for the signaling interaction, the UE 3100 may report the selection to the base station 3200 via sidelink SR for the shortened time interval.

At step ST107, the base station 3200 decodes BSR and generates control information. In an embodiment, when the BSR is sidelink BSR for the shortened time interval, the base station 3200 may acknowledge that UE 3100 selects to interact with the base station using the selected time interval at step, and the base station further decides if using the selected time interval for the signaling interaction of the base station and the UE 3100.

At step ST108, the base station 3200 transmits control information to UE 3100.

At step ST109, the UE 3100 decodes the control information and encodes data for sidelink transmission.

At step ST110, the UE 3100 performs sidelink transmission. In an embodiment, when the flowchart is applied in LTE, for example, mode 3 in LTE-V2X, the UE 3100 performs sidelink transmission using TTI. In an embodiment, when the flowchart is applied in NR, the UE 3100 may perform sidelink transmission using mini-slot or non-slot unit when the UE 3100 performs signaling interaction with the base station 3200 using the mini-slot.

Figure 12:
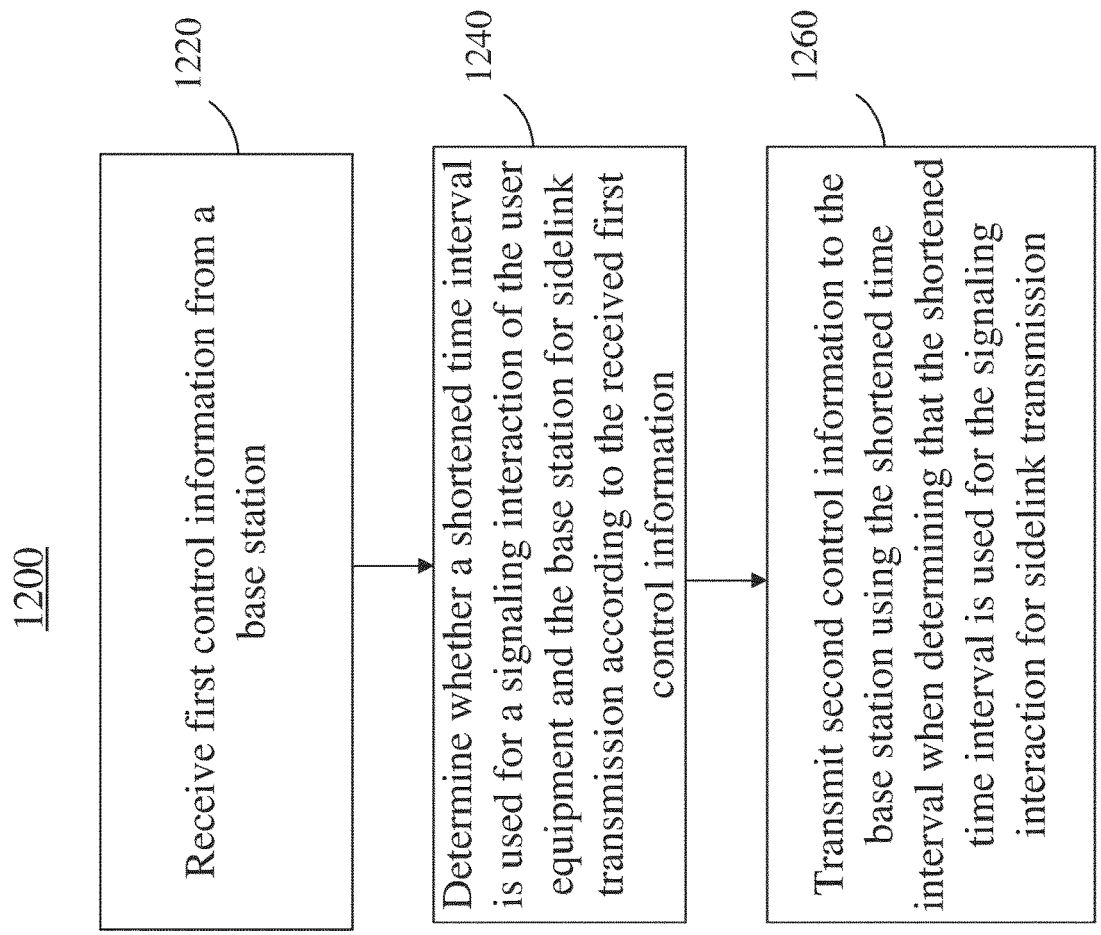
FIG. 12 schematically shows a flowchart of a communication method according to embodiments of the present invention.

When the UE 3100 determines that the shortened time interval is used for the signaling interaction for sidelink transmission at a certain step, the following steps in the signaling interaction are implemented using the shortened time interval. For example, when the UE 3100 determines that the shortened time interval is used for the signaling interaction for sidelink transmission at step ST105, the following steps ST106-ST109 in the signaling interaction are implemented using the shortened time interval FIG. 12 schematically shows a flowchart of a communication method 1200 according to embodiments of the present invention. The communication method is for a user equipment (UE) operative for sidelink transmission based on base station scheduling. The flowchart 1200 of FIG. 12 is described in combination with FIG. 2 and FIG. 6.

At step 1220, the receiver 210 receives first control information from a base station.

At step 1240, the determination circuitry 230 determines whether a shortened time interval is used for a signaling interaction of the user equipment 600 and the base station for sidelink transmission according to the received first control information.

At step 1260, the transmitter 250 transmits second control information to the base station using the shortened time interval after the determination circuitry 230 determines that the shortened time interval is used for the signaling interaction for sidelink transmission, wherein a length of the shortened time interval is less than a length of a standard time interval.

In an embodiment, the shortened time interval is a shortened transmission time interval (sTTI), the standard time interval is a transmission time interval (TTI) and sTTI is a fraction of TTI in terms of OFDM symbol.

In an embodiment, wherein the shortened time interval is mini-slot or non-slot unit in the New Radio system, the standard time interval is slot in the New Radio system, and wherein mini-slot or non-slot is a fraction of slot in terms of OFDM symbol.

In an embodiment, wherein the first control information includes one or more of downlink control information (DCI) and radio resource control (RRC) signaling, and wherein the method further includes determining whether the shortened time interval is used for the signaling interaction according to one or more of radio resource control (RRC) signaling and the downlink control information.

In an embodiment, the method further includes determining that the shortened time interval is used for the signaling interaction when the receiver 210 receives the first control information within a control resource that is specially specified for the shortened time interval.

In an embodiment, wherein the first control information includes downlink control information (DCI), and the method further includes: determining whether the shortened time interval is used for the signaling interaction according to one or more of a search space in the user equipment 600 and a size of the downlink control information (DCI), when the receiver 210 receives the downlink control information within a control resource that is shared by the shortened time interval and the standard time interval.

In an embodiment, the first control information includes sidelink related downlink control information (DCI), and the method further includes transmitting sidelink transmission at a transmission time not earlier than a first time determined according to one of the following equations a) and b):

$$T_{DL} - \frac{N_{TA}}{2} \times Ts + m \times 10^{-3} + Y \times S \quad \text{a)}$$

$$T_{DL} - \frac{N_{TA}}{2} \times Ts + (X + m) \times 10^{-3} \quad \text{b)}$$

Wherein $$T_{DL} - \frac{N_{TA}}{2} \times Ts$$

indicates the time that base station transmits sidelink related DCI, m indicates a time offset, S indicates the length of the shortened time interval in second (s), and X and Y relate to capacity of the user equipment and are configured by RRC or is predetermined.

In an embodiment, the method further including: selecting the shortened time interval or the standard time interval for the signaling interaction of the user equipment and the base station, wherein the transmitter 250 transmits a report indicating the selected time interval for the signaling interaction via one or more of scheduling request and buffer-status report.

In an embodiment, after the user equipment determines that the mini-slot or the non-slot unit is used for the signaling interaction in the New Radio system, the user equipment performs sidelink transmission using the mini-slot or the non-slot unit.

Figure 13:
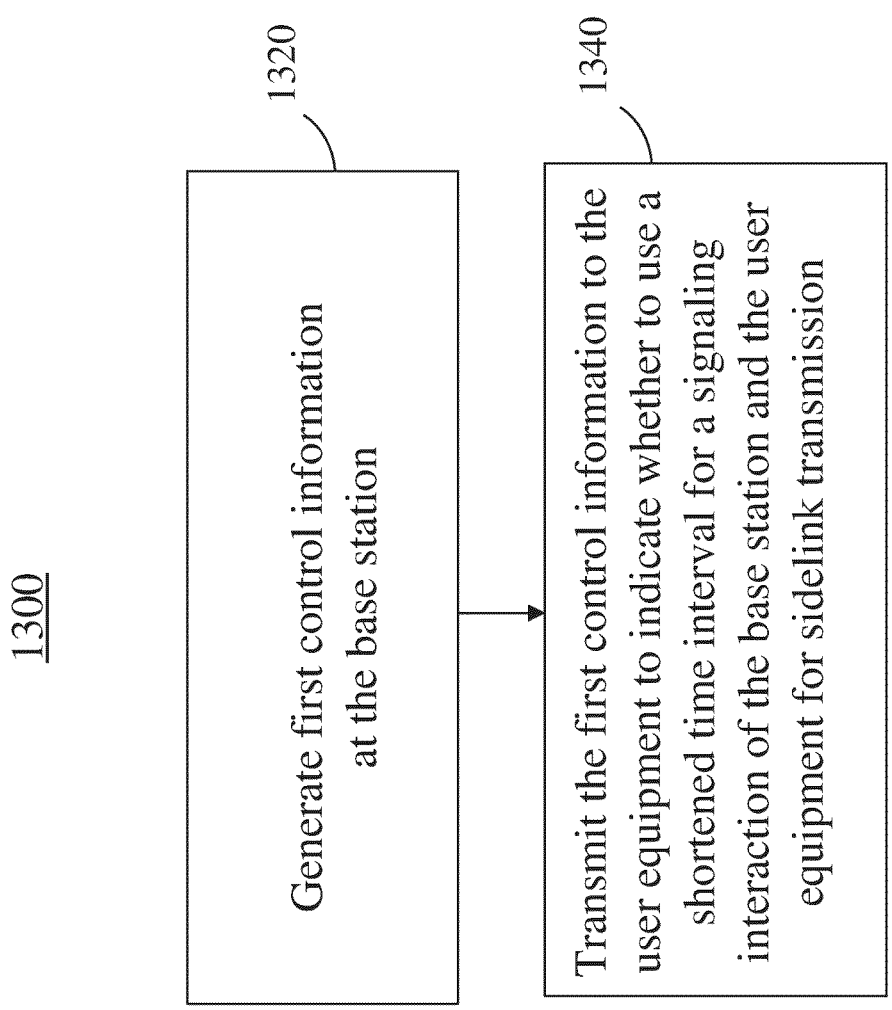
FIG. 13 schematically shows a flowchart of a communication method according to embodiments of the present invention.

FIG. 13 schematically shows a flowchart 1300 of a communication method according to embodiments of the present invention. The flowchart 1300 is described in combination with FIG. 8 and FIG. 9.

At step 1320, the circuit 810 generates first control information at the base station.

At step 1340, the transmitter 830 transmits the first control information to the user equipment to indicate whether to use a shortened time interval for a signaling interaction of the base station and the user equipment for sidelink transmission, wherein a length of the shortened time interval is less than a length of a standard time interval.

In an embodiment, wherein the shortened time interval is a shortened transmission time interval (sTTI), the standard time interval is a transmission time interval (TTI) and sTTI is a fraction of TTI in terms of OFDM symbol, and wherein the user equipment transmits second control information to the base station during the signaling interaction using sTTI after determining that the sTTI is used for the signaling interaction.

In an embodiment, wherein the shortened time interval is mini-slot or non-slot unit in the New Radio system, the standard time interval is slot in the New Radio system, and wherein mini-slot or non-slot is a fraction of slot in terms of OFDM symbol, and wherein the user equipment transmits second control information during the signaling interaction to the base station using mini-slot or non-slot unit after determining that the mini-slot or non-slot is used for the signaling interaction.

In an embodiment, wherein the first control information includes one or more of downlink control information (DCI) and radio resource control (RRC) signaling, and the method further includes configuring one or more of radio resource control (RRC) signaling and the downlink control information to explicitly indicate whether to use the shortened time interval for the signaling interaction.

In an embodiment, wherein when the user equipment receives the first control information within a control resource that is specially specified for the shortened time interval, the user equipment determines that the shortened time interval is used for the signaling interaction.

In an embodiment, wherein the first control information includes downlink control information, and wherein when the user equipment receives the downlink control information within a control resource that is shared by the shortened time interval and the standard time interval, the user equipment determines whether the shortened time interval is used for the signaling interaction according to one or more of a search space in the user equipment and a size of the downlink control information.

In an embodiment, wherein the first control information includes sidelink related downlink control information (DCI), and the time of transmitting sidelink transmission by the user equipment is not earlier than a first time determined according to one of the following equations a) and b):

$$T_{DL} - \frac{N_{TA}}{2} \times Ts + m \times 10^{-3} + Y \times S \quad \text{a)}$$

$$T_{DL} - \frac{N_{TA}}{2} \times Ts + (X + m) \times 10^{-3} \quad \text{b)}$$

Wherein $$T_{DL} - \frac{N_{TA}}{2} \times Ts$$

indicates the time that base station transmits sidelink related DCI, m indicates a time offset, S indicates the length of the shortened time interval in second (s), and X and Y relate to capacity of the user equipment and are configured by RRC or predetermined.

In an embodiment, the method further includes receiving a report from the user equipment via one or more of scheduling request and buffer-status report, wherein the report is indicative of a time interval selected by the user equipment for the signaling interaction; and deciding whether to use the time interval selected by the user equipment for the signaling interaction with the user equipment.

In an embodiment, wherein after the user equipment determines that the mini-slot or the non-slot unit is used for the signaling interaction in the New Radio system, the user equipment performs sidelink transmission using the mini-slot or the non-slot unit.

The above description is on illustrative embodiments of the present disclosure, but not for limitation.

In addition, embodiments of the present disclosure can at least provide the following subject matters.
 (1). A user equipment (UE) operative for sidelink transmission based on base station scheduling, comprising:
    a receiver, operative to receive first control information from a base station;
    determination circuitry, operative to determine whether a shortened time interval is used for a signaling interaction of the user equipment and the base station for sidelink transmission according to the received first control information; and
    a transmitter, operative to transmit second control information to the base station during the signaling interaction using the shortened time interval after the determination circuitry determines that the shortened time interval is used for the signaling interaction for sidelink transmission,
    wherein a length of the shortened time interval is less than a length of a standard time interval.
 (2). The user equipment of claim (1), wherein the shortened time interval is a shortened transmission time interval (sTTI), the standard time interval is a transmission time interval (TTI), and sTTI is a fraction of TTI in terms of OFDM symbol.
 (3). The user equipment of claim (1), wherein the shortened time interval is mini-slot or non-slot unit in the New Radio system, the standard time interval is slot in the New Radio system, and wherein mini-slot or non-slot is a fraction of slot in terms of OFDM symbol.
 (4). The user equipment of the claim (1), wherein the first control information comprises one or more of downlink control information (DCI) and radio resource control (RRC) signaling, and wherein the determination circuitry determines whether the shortened time interval is used for the signaling interaction according to one or more of radio resource control (RRC) signaling and the downlink control information.
 (5). The user equipment of claim (1), wherein when the receiver receives the first control information within a control resource that is specially specified for the shortened time interval, the determination circuitry determines that the shortened time interval is used for the signaling interaction.
 (6). The user equipment of claim (1), wherein the first control information comprises downlink control information (DCI), and wherein when the receiver receives the downlink control information within a control resource that is shared by the shortened time interval and the standard time interval, the determination circuitry determines whether the shortened time interval is used for the signaling interaction according to one or more of a search space in the user equipment and a size of the downlink control information (DCI).
 (7). The user equipment of claim (1), wherein the first control information comprises sidelink related downlink control information (DCI), and the time of transmitting sidelink transmission by the user equipment is not earlier than a first time determined according to one of the following equations a) and b):

$$T_{DL} - \frac{N_{TA}}{2} \times Ts + m \times 10^{-3} + Y \times S \quad \text{a)}$$

$$T_{DL} - \frac{N_{TA}}{2} \times Ts + (X + m) \times 10^{-3} \quad \text{b)}$$

Wherein $$T_{DL} - \frac{N_{TA}}{2} \times Ts$$

indicates the time that base station transmits sidelink related DCI, m indicates a time offset, S indicates the length of the shortened time interval in second (s), and X and Y relate to capacity of the user equipment and are configured by RRC or predetermined.
 (8). The user equipment of claim (1), further comprising:
    selection circuitry, operative to select the shortened time interval or the standard time interval for the signaling interaction of the user equipment and the base station for sidelink transmission,
    wherein the transmitter transmits a report indicating the selected time interval for the signaling interaction via one or more of scheduling request and buffer-status report.
 (9). The user equipment of claim (3), wherein after the user equipment determines that the mini-slot or the non-slot unit is used for the signaling interaction in the New Radio system, the user equipment performs sidelink transmission using the mini-slot or the non-slot unit.

(10). A communication method for a user equipment (UE) operative for sidelink transmission based on base station scheduling, comprising:

receiving first control information from a base station;

determining whether a shortened time interval is used for a signaling interaction of the user equipment and the base station for sidelink transmission according to the received first control information; and transmitting second control information to the base station using the shortened time interval after determining that the shortened time interval is used for the signaling interaction for sidelink transmission, wherein a length of the shortened time interval is less than a length of a standard time interval.

(11). The communication method of claim (10), wherein the shortened time interval is a shortened transmission time interval (sTTI), the standard time interval is a transmission time interval (TTI) and sTTI is a fraction of TTI in terms of OFDM symbol.

(12). The communication method of claim (10), wherein the shortened time interval is mini-slot or non-slot unit in the New Radio system, the standard time interval is slot in the New Radio system, and wherein mini-slot or non-slot is a fraction of slot in terms of OFDM symbol.

(13). The communication method the claim (10), wherein the first control information comprises one or more of downlink control information (DCI) and radio resource control (RRC) signaling, and wherein the method further comprises: determining whether the shortened time interval is used for the signaling interaction according to one or more of radio resource control (RRC) signaling and the downlink control information.

(14). The communication method of claim (10), further comprising determining that the shortened time interval is used for the signaling interaction when the receiver receives the first control information within a control resource that is specially specified for the shortened time interval.

(15). The communication method of claim (10), wherein the first control information comprises downlink control information (DCI), and wherein the method further comprises determining whether the shortened time interval is used for the signaling interaction according to one or more of a search space in the user equipment and a size of the downlink control information (DCI), when the receiver receives the downlink control information within a control resource that is shared by the shortened time interval and the standard time interval.

(16). The communication method of claim (10), wherein the first control information comprises sidelink related downlink control information (DCI), and the method further comprises: transmitting sidelink transmission by the user equipment at a time not earlier than a first time determined according to one of the following equations a) and b):

$$T_{DL} - \frac{N_{TA}}{2} \times Ts + m \times 10^{-3} + Y \times S \quad \text{a)}$$

$$T_{DL} - \frac{N_{TA}}{2} \times Ts + (X + m) \times 10^{-3} \quad \text{b)}$$

wherein $$T_{DL} - \frac{N_{TA}}{2} \times Ts$$

indicates the time that base station transmits sidelink related DCI, m indicates a time offset, S indicates the length of the shortened time interval in second (s), and X and Y relate to capacity of the user equipment and are configured by RRC or predetermined.

(17). The communication method of claim (10), further comprising:

selecting the shortened time interval or the standard time interval for the signaling interaction of the user equipment and the base station for sidelink transmission, wherein the transmitter transmits a report indicating the selected time interval for the signaling interaction via one or more of scheduling request and buffer-status report.

(18). The communication method of claim (12), wherein after the user equipment determines that the mini-slot or the non-slot unit is used for the signaling interaction in the New Radio system, the user equipment performs sidelink transmission using the mini-slot or the non-slot unit.

(19). A base station operative for scheduling sidelink transmission for a user equipment (UE), comprising:

a control information generator, operative to generate first control information; and a transmitter, operative to transmit the first control information to the user equipment to indicate whether to use a shortened time interval for a signaling interaction of the base station and the user equipment for sidelink transmission, wherein a length of the shortened time interval is less than a length of a standard time interval.

(20). The base station of the claim (19), wherein the shortened time interval is a shortened transmission time interval (sTTI), the standard time interval is a transmission time interval (TTI) and sTTI is a fraction of TTI in terms of OFDM symbol, and wherein the user equipment transmits second control information to the base station during the signaling interaction using sTTI after determining that the sTTI is used for the signaling interaction.

(21). The base station of claim (19), wherein the shortened time interval is mini-slot or non-slot unit in the New Radio system, the standard time interval is slot in the New Radio system, and wherein mini-slot or non-slot unit is a fraction of slot in terms of OFDM symbol, and wherein the user equipment transmits second control information during the signaling interaction to the base station using mini-slot or non-slot unit after determining that the mini-slot or non-slot is used for the signaling interaction.

(22). The base station of the claim (19), wherein the first control information comprises one or more of downlink control information (DCI) and radio resource control (RRC) signaling, and wherein whether to use the shortened time interval for the signaling interaction is explicitly indicated by one or more of radio resource control (RRC) signaling and the downlink control information.

(23). The base station of claim (19), wherein when the user equipment receives the first control information within a control resource that is specially specified for the shortened time interval, the user equipment determines that the shortened time interval is used for the signaling interaction.

(24). The base station of claim (19), wherein the first control information comprises downlink control information, and wherein when the user equipment receives the downlink control information within a control resource that is shared by the shortened time interval and the standard time interval, the user equipment determines whether the shortened time interval is used for the signaling interaction according to one or more of a search space in the user equipment and a size of the downlink control information.

(25). The base station of claim (19), wherein the first control information comprises sidelink related downlink control information (DCI), and the time of transmitting sidelink transmission by the user equipment is not earlier than a first time determined according to one of the following equations a) and b):

$$T_{DL} - \frac{N_{TA}}{2} \times Ts + m \times 10^{-3} + Y \times S \quad \text{a)}$$

$$T_{DL} - \frac{N_{TA}}{2} \times Ts + (X + m) \times 10^{-3} \quad \text{b)}$$

wherein $$T_{DL} - \frac{N_{TA}}{2} \times Ts$$

indicates the time that base station transmits sidelink related DCI, m indicates a time offset, S indicates the length of the shortened time interval in second (s), and X and Y relate to capacity of the user equipment and are configured by RRC or predetermined.

(26). The base station of claim (19), further comprising:
a receiver, operative to receive a report from the user equipment via one or more of scheduling request and buffer-status report, wherein the report is indicative of a time interval selected by the user equipment for the signaling interaction; and
decision circuitry, operative to decide whether to use the time interval selected by the user equipment for the signaling interaction with the user equipment.

(27). The base station of claim (21), wherein after the user equipment determines that the mini-slot or the non-slot unit is used for the signaling interaction in the New Radio system, the user equipment performs sidelink transmission using the mini-slot or the non-slot unit.

(28). A communication method for a base station scheduling sidelink transmission for a user equipment (UE), comprising:
generating first control information at the base station; and
transmitting the first control information to the user equipment to indicate whether to use a shortened time interval for a signaling interaction of the base station and the user equipment for sidelink transmission,
wherein a length of the shortened time interval is less than a length of a standard time interval.

(29). The communication method of the claim (28), wherein the shortened time interval is a shortened transmission time interval (sTTI), the standard time interval is a transmission time interval (TTI) and sTTI is a fraction of TTI in terms of OFDM symbol, and wherein the user equipment transmits second control information to the base station during the signaling interaction using sTTI after determining that the sTTI is used for the signaling interaction.

(30). The communication method of claim (28), wherein the shortened time interval is mini-slot or non-slot unit in the New Radio system, the standard time interval is slot in the New Radio system, and wherein mini-slot or non-slot is a fraction of slot in terms of OFDM symbol, and wherein the user equipment transmits second control information during the signaling interaction to the base station using mini-slot or non-slot unit after determining that the mini-slot or non-slot is used for the signaling interaction.

(31). The communication method of the claim (28), wherein the first control information comprises one or more of downlink control information (DCI) and radio resource control (RRC) signaling, and wherein whether to use the shortened time interval for the signaling interaction is explicitly indicated by one or more of radio resource control (RRC) signaling and the downlink control information.

(32). The communication method of claim (28), wherein when the user equipment receives the first control information within a control resource that is specially specified for the shortened time interval, the user equipment determines that the shortened time interval is used for the signaling interaction.

(33). The communication method of claim (28), wherein the first control information comprises downlink control information, and the method further comprises determining whether the shortened time interval is used for the signaling interaction according to one or more of a search space in the user equipment and a size of the downlink control information, when the user equipment receives the downlink control information within a control resource that is shared by the shortened time interval and the standard time interval, the user equipment.

(34). The communication method of claim (28), wherein the first control information comprises sidelink related downlink control information (DCI), and the time of transmitting sidelink transmission by the user equipment is not earlier than a first time determined according to one of the following equations a) and b):

$$T_{DL} - \frac{N_{TA}}{2} \times Ts + m \times 10^{-3} + Y \times S \quad \text{a)}$$

$$T_{DL} - \frac{N_{TA}}{2} \times Ts + (X + m) \times 10^{-3} \quad \text{b)}$$

wherein $$T_{DL} - \frac{N_{TA}}{2} \times Ts$$

indicates the time that base station transmits sidelink related DCI, m indicates a time offset, S indicates the length of the shortened time interval in second (s), and X and Y relate to capacity of the user equipment and is configured by RRC or is predetermined.

(35). The communication method of claim (28), further comprising:

receiving a report from the user equipment via one or more of scheduling request and buffer-status report, wherein the report is indicative a time interval selected by the user equipment for the signaling interaction; and deciding whether to use the time interval selected by the user equipment for the signaling interaction with the user equipment.

(36). The base station of claim (30), wherein after the user equipment determines that the mini-slot or the non-slot unit is used for the signaling interaction in the New Radio system, the user equipment performs sidelink transmission using the mini-slot or the non-slot unit.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

Examples of several embodiments of the present disclosure have been described in detail above, with reference to the attached illustrations of specific embodiments. Because it is not possible, of course, to describe every conceivable combination of components or techniques, those skilled in the art will appreciate that various modifications may be made to the above described embodiments without departing from the scope of the present disclosure. For example, it will be readily appreciated that although the above embodiments are described with reference to parts of a The 3rd Generation Partnership Project (3GPP) network, an embodiment of the present disclosure will also be applicable to like networks, such as a successor of the 3GPP network, having like functional components.

Therefore, in particular, the terms 3GPP and associated or related terms used in the above description and in the enclosed drawings and any appended claims now or in the future are to be interpreted accordingly.

The present disclosure can be realized by software, hardware, or software in cooperation with hardware. Each functional block used in the description of each embodiment described above can be realized by an LSI as an integrated circuit, and each process described in the each embodiment may be controlled by LSI. They may be individually formed as chips, or one chip may be formed so as to include a part or all of the functional blocks. They may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used.

Notably, modifications and other embodiments of the disclosed disclosure(s) will come to mind to one skilled in the art having the benefit of the teachings presented in the foregoing descriptions and the associated drawings. Therefore, it is to be understood that the disclosure(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. An integrated circuit to control a process, the process comprising:
receiving first control information for a sidelink transmission from a base station;
determining a shortened time interval used in signaling between a user equipment (UE) and the base station for the sidelink transmission according to the received first control information; and
transmitting second control information to the base station using the shortened time interval,
wherein the shortened time interval is less than a standard time interval that is used in signaling between the UE and another UE in the sidelink transmission, and a time offset between reception of the first control information and the sidelink transmission is configured.

2. The integrated circuit according to claim 1, comprising: circuitry which, in operation, controls the process;
at least one input coupled to the circuitry, wherein the at least one input, in operation, inputs data; and
at least one output coupled to the circuitry, wherein the at least one output, in operation, outputs data.

3. The integrated circuit of claim 1, wherein the shortened time interval is a shortened transmission time interval (sTTI), the standard time interval is a transmission time interval (TTI), and the sTTI is a fraction of the TTI in terms of OFDM symbols.

4. The integrated circuit of claim 1, wherein the shortened time interval is a mini-slot or non-slot unit in a New Radio system, the standard time interval is a slot in the New Radio system, and the mini-slot or the non-slot is a fraction of the slot in terms of OFDM symbols.

5. The integrated circuit of the claim 1, wherein the first control information comprises one or more of downlink control information (DCI) and radio resource control (RRC) signaling, and wherein the determining include determining whether the shortened time interval is used for the signaling according to the one or more of the DCI and RRC signaling.

6. The integrated circuit of claim 1, wherein when receiving the first control information within a control resource that is specially specified for the shortened time interval, the determining includes determining that the shortened time interval is used for the signaling.

7. The integrated circuit of claim 1, wherein the first control information comprises downlink control information (DCI), and wherein when receiving the DCI within a control resource that is shared by the shortened time interval and the standard time interval, the determining includes determining whether the shortened time interval is used for the signaling according to one or more of a search space in the UE and a size of the DCI.

8. The integrated circuit of claim 1, wherein the first control information comprises sidelink related downlink control information (DCI), and a time of transmitting the sidelink transmission by the UE is not earlier than a first time determined according to one of the following equations a) and b):

$$T_{DL} - \frac{N_{TA}}{2} \times Ts + m \times 10^{-3} + Y \times S \qquad a)$$

$$T_{DL} - \frac{N_{TA}}{2} \times Ts + (X + m) \times 10^{-3} \qquad b)$$

wherein $$T_{DL} - \frac{N_{TA}}{2} \times Ts$$

indicates a time that base station transmits the sidelink related DCI, m indicates a time offset, S indicates a length of the shortened time interval in second (s), and X and Y relate to a capacity of the UE and are configured by radio resource control (RRC) signalling or predetermined.

9. The integrated circuit of claim 1, wherein:
the process comprises selecting the shortened time interval or the standard time interval for the signaling between the UE and the base station for the sidelink transmission, and transmitting a report indicating the selected time interval for the signaling via one or more of a scheduling request and a buffer-status report.

10. The integrated circuit of claim 4, wherein after determining that the mini-slot or the non-slot unit is used for the signaling in the New Radio system, the UE performs the sidelink transmission using the mini-slot or the non-slot unit.

11. An integrated circuit comprising circuitry, which, in operation:
controls receiving first control information for a sidelink transmission from a base station;
determines a shortened time interval used in signaling between a user equipment (UE) and the base station for the sidelink transmission according to the received first control information; and
controls transmitting second control information to the base station using the shortened time interval,
wherein the shortened time interval is less than a standard time interval that is used in signaling between the UE and another UE in the sidelink transmission, and a time offset between reception of the first control information and the sidelink transmission is configured.

12. The integrated circuit according to claim 11, comprising:
at least one input coupled to the circuitry, wherein the at least one input, in operation, inputs data; and
at least one output coupled to the circuitry, wherein the at least one output, in operation, outputs data.

13. The integrated circuit of claim 11, wherein the shortened time interval is a shortened transmission time interval (sTTI), the standard time interval is a transmission time interval (TTI), and the sTTI is a fraction of the TTI in terms of OFDM symbols.

14. The integrated circuit of claim 11, wherein the shortened time interval is a mini-slot or non-slot unit in a New Radio system, the standard time interval is a slot in the New Radio system, and the mini-slot or the non-slot is a fraction of the slot in terms of OFDM symbols.

15. The integrated circuit of the claim 11, wherein the first control information comprises one or more of downlink control information (DCI) and radio resource control (RRC) signaling, and wherein the circuitry, in operation, determines whether the shortened time interval is used for the signaling according to the one or more of the DCI and RRC signaling.

16. The integrated circuit of claim 11, wherein when receiving the first control information within a control resource that is specially specified for the shortened time interval, the circuitry, in operation, determines that the shortened time interval is used for the signaling.

17. The integrated circuit of claim 11, wherein the first control information comprises downlink control information (DCI), and wherein when receiving the DCI within a control resource that is shared by the shortened time interval and the standard time interval, the circuitry, in operation, determines whether the shortened time interval is used for the signaling according to one or more of a search space in the UE and a size of the DCI.

18. The integrated circuit of claim 11, wherein the first control information comprises sidelink related downlink control information (DCI), and a time of transmitting the sidelink transmission by the UE is not earlier than a first time determined according to one of the following equations a) and b):

$$T_{DL} - \frac{N_{TA}}{2} \times Ts + m \times 10^{-3} + Y \times S \qquad a)$$

$$T_{DL} - \frac{N_{TA}}{2} \times Ts + (X + m) \times 10^{-3} \qquad b)$$

wherein $$T_{DL} - \frac{N_{TA}}{2} \times Ts$$

indicates a time that base station transmits the sidelink related DCI, m indicates a time offset, S indicates a length of the shortened time interval in second (s), and X and Y relate to a capacity of the UE and are configured by radio resource control (RRC) signalling or predetermined.

19. The integrated circuit of claim 11, wherein:
the circuitry, in operation, selects the shortened time interval or the standard time interval for the signaling between the UE and the base station for the sidelink transmission, and controls transmitting a report indicating the selected time interval for the signaling via one or more of a scheduling request and a buffer-status report.

20. The integrated circuit of claim 14, wherein after determining that the mini-slot or the non-slot unit is used for the signaling in the New Radio system, the UE performs the sidelink transmission using the mini-slot or the non-slot unit.

* * * * *